United States Patent
O'Brien et al.

(10) Patent No.: US 10,326,751 B2
(45) Date of Patent: **\*Jun. 18, 2019**

(54) TECHNIQUES FOR DOMAIN CAPTURE

(71) Applicant: Dropbox, Inc., San Francisco, CA (US)

(72) Inventors: George O'Brien, San Mateo, CA (US); Emil Ibrishimov, San Francisco, CA (US); Jung Park, Pacifica, CA (US); David Stafford, Cary, NC (US); Heinrich Koutcherouk, Tel Aviv (IL)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/138,362

(22) Filed: Sep. 21, 2018

(65) Prior Publication Data
US 2019/0028450 A1    Jan. 24, 2019

Related U.S. Application Data

(63) Continuation of application No. 16/102,353, filed on Aug. 13, 2018, which is a continuation of application
(Continued)

(51) Int. Cl.
*H04L 29/06* (2006.01)
*H04L 29/08* (2006.01)
(Continued)

(52) U.S. Cl.
CPC ............ *H04L 63/08* (2013.01); *G06F 16/316* (2019.01); *G06F 16/337* (2019.01); *G06F 21/45* (2013.01);
(Continued)

(58) Field of Classification Search
CPC ....... H04L 63/08; H04L 63/10; H04L 63/102; H04L 63/104; H04L 67/306; G06F 21/31; G06F 21/45; G06F 21/6209
(Continued)

(56) References Cited

U.S. PATENT DOCUMENTS 5,768,519 A   6/1998   Swift et al.
6,119,933 A   9/2000   Wong
(Continued)

OTHER PUBLICATIONS

O'Brien, U.S. Appl. No. 16/102,353, filed Aug. 13, 2018, Office Action dated Oct. 18, 2018.
(Continued)

*Primary Examiner* — Hosuk Song
(74) *Attorney, Agent, or Firm* — Hickman Palermo Becker Bingham LLP; Adam C. Stone

(57) ABSTRACT

Techniques for domain capture. In one embodiment, for example, a method comprises detecting an attempt to create a personal user account with an online service that uses an electronic mail address that belongs to an owner of a particular domain name service domain. Based on the detecting, the online service prompts a user associated with the attempt to create a team account with the online service that is under management of the owner of the particular domain name service domain. Also based on the detecting the online service offers the user an option of creating a personal user account with the online service using an unowned electronic mail address.

21 Claims, 20 Drawing Sheets

Related U.S. Application Data

No. 15/056,829, filed on Feb. 29, 2016, now Pat. No. 10,079,817.

(51) Int. Cl.
*H04L 12/58* (2006.01)
*G06F 21/62* (2013.01)
*G06F 16/31* (2019.01)
*G06F 16/335* (2019.01)
*G06F 21/45* (2013.01)
*H04L 29/12* (2006.01)

(52) U.S. Cl.
CPC .......... *G06F 21/6209* (2013.01); *H04L 51/22* (2013.01); *H04L 51/28* (2013.01); *H04L 67/1097* (2013.01); *H04L 67/306* (2013.01); *G06F 2221/2117* (2013.01); *H04L 61/1511* (2013.01); *H04L 61/303* (2013.01); *H04L 61/307* (2013.01)

(58) Field of Classification Search
USPC .......................................... 726/2–7; 713/168
See application file for complete search history.

(56) References Cited

U.S. PATENT DOCUMENTS

| | | | |
|---|---|---|---|
| 6,144,959 A | 11/2000 | Aderson et al. | |
| 6,697,942 B1 * | 2/2004 | L'Heureux | H04L 51/18 380/238 |
| 7,676,829 B1 | 3/2010 | Gui et al. | |
| 7,949,785 B2 | 5/2011 | Alkhatib | |
| 7,992,008 B2 | 8/2011 | Ashok et al. | |
| 8,001,035 B2 | 8/2011 | Kwan | |
| 8,010,460 B2 | 8/2011 | Work | |
| 8,234,695 B2 | 7/2012 | Eldridge et al. | |
| 8,327,428 B2 | 12/2012 | Bailey et al. | |
| 8,381,265 B2 | 2/2013 | Muraki | |
| 8,484,456 B2 * | 7/2013 | Low | G06Q 20/382 705/64 |
| 8,620,942 B1 | 12/2013 | Hoffman et al. | |
| 8,682,979 B2 * | 3/2014 | LeVasseur | H04L 63/126 709/206 |
| 8,949,956 B1 | 2/2015 | Baldwin et al. | |
| 9,118,731 B2 | 8/2015 | Bennett | |
| 9,137,411 B2 * | 9/2015 | Bae | G06Q 10/107 |
| 9,894,136 B2 * | 2/2018 | Gupta | H04L 43/045 |
| 10,079,817 B2 | 9/2018 | O'Brien | |
| 2007/0100856 A1 | 5/2007 | Ebbesen | |
| 2010/0088753 A1 | 4/2010 | Ayres | |
| 2013/0031616 A1 | 1/2013 | Ghosh et al. | |
| 2013/0340053 A1 | 12/2013 | McCoy et al. | |
| 2014/0025949 A1 | 1/2014 | Kay et al. | |
| 2014/0282963 A1 | 9/2014 | Wildermuth et al. | |
| 2018/0351935 A1 | 12/2018 | O'Brien | |

OTHER PUBLICATIONS

O'Brien, U.S. Appl. No. 15/056,829, filed Feb. 29, 2016, Office Action dated Nov. 15, 2017.
O'Brien, U.S. Appl. No. 15/056,829, filed Feb. 29, 2016, Notice of Allowance dated May 22, 2018.
Cook, Rob, "Source: Queensland Cyber Infrastructure Foundation Ltd", dated Oct. 29, 2013, 24 pages.
Author unavailable, "https://community.secondlife.com/t5/English-Knowledge-Base/Password-and-account-information/ta-p/700017", Feb. 24, 2011, 3 pages.
Author unavailable, "http://www.experimentgarden.com/2009/11/why-does-amazoncom-allows-multiple.html" Dec. 31, 2009, 8 pages.

\* cited by examiner

US 10,326,751 B2

TECHNIQUES FOR DOMAIN CAPTURE

PRIORITY CLAIM

This application claims the benefit as a continuation of U.S. patent application Ser. No. 16/102,353, filed Aug. 13, 2018, which is a continuation of U.S. patent application Ser. No. 15/056,829, filed Feb. 29, 2016 (now U.S. Pat. No. 10,079,817), the entire contents of each of which is hereby incorporated by reference as if fully set forth herein. The applicant hereby rescinds any disclaimer of claim scope in the priority applications, including the prosecution histories thereof, and hereby advises the Office that claims presented herein may be broader in at least some respects than any claim presented in the priority applications.

TECHNICAL FIELD

The present Application relates to online services. More specifically, the example embodiments of the present invention described below relate to techniques for domain capture in the context of online services.

BACKGROUND

Many online services require users to have accounts with the services in order to use the services in a meaningful way. For example, most online shopping services, content collaboration services, content management services, and social networking services require that users create an account with the services before being able to use the services.

Some online service accounts are "free" accounts. A free account does not require the user to pay a monetary amount to the operator of the online service to use the service (e.g., as a periodic subscription fee, by purchasing a license, etc.). Other online service accounts require monetary payment. Typically, in exchange for a greater level of service provided by the online service to the user (e.g., more storage space, more features, better support, etc.). Whether a pay account or a free account, an online service account for a user (referred to hereinafter as just a "user account") is often associated with an electronic mail address (e-mail address) for the user. The e-mail address may also be used by the user to send and receive electronic mail messages (e-mail messages), possibly via another online service such as, for example, and Internet e-mail service.

Online services may use e-mail addresses for purposes other than to communicate with users via e-mail. For example, an e-mail address may be used to uniquely identify the user. Using e-mail addresses to identify users is useful for online services because e-mail addresses, by the domain name part, are globally unique. For example, in the e-mail address "bob@acme.com", "bob" is the local part of the e-mail address and "acme.com" is the domain name part of the e-mail address and the "@" symbol separates the local part from the domain name part. An online service may use the e-mail address "bob@acme.com" to uniquely identify a user account held with the online service.

In many cases, users create an account with online services using an e-mail address that "belongs" to someone else. For example, the e-mail address may belong to another person or belong to an organization, company, school, government, or other entity that has registered to use the Internet domain of the e-mail address. For example, the Internet domain "acme.com" may belong to Acme Corporation by the Acme Corporation registering, with an accredited domain name registrar, the name "acme" within the ".com" top-level Internet domain. In this case, the e-mail address "bob@acme.com" belongs to Acme Corporation even though an employee of Acme Corporation may use the e-mail address with the permission of the Acme Corporation to send and receive e-mail messages.

Throughout this description, a person or entity that is the direct or indirect registrant of an Internet domain is referred to herein as an "owner" of the Internet domain and, consequently, the owner of all e-mail addresses, whether currently in use or not, that have that Internet domain in the domain name part of the e-mail address. A direct registrant of an Internet domain is the person or entity that registers the Internet domain with an accredited domain name registrar. An indirect registrant is any person or entity that has permission from the direct registrant to operate the Internet domain. For example, an indirect registrant may have the right to add, remove, and update Domain Name Service (DNS) records (e.g., CNAME records, MX records, etc.) for the Internet domain or to transfer the Internet domain to another registrar.

It is often the case that an owner of an e-mail address is different than the person or entity that uses the e-mail address to send and receive e-mail messages. For example, Bob, an employee of Acme Corporation, may use the e-mail address "bob@acme.com" to send and receive e-mail messages. Bob may also use that e-mail address to create an account with a content management service that Bob uses to manage both personal and work files. However, the Acme Corporation may be the owner of the Internet domain "acme.com". Thus, the Acme Corporation, and not Bob, owns the "bob@acme.com" e-mail address.

For a variety of reasons, owners of e-mail addresses (e.g., employers) may want to control how those e-mail addresses are used by users of online services in the context of using those services. In particular, an owner of an e-mail address may wish to stop a user from using the e-mail address as the user's identity with an online service. Alternatively, the owner may want to allow the user to continue using the e-mail address with the online service but only in the context of a user account with the online service that is under management or administration of the owner. The example embodiments disclosed herein provide a solution to these and other needs.

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

BRIEF DESCRIPTION OF THE DRAWINGS

The example embodiments of the present invention are illustrated by way of example, and not in way by limitation, in the figures of the accompanying drawings and in which like reference numerals refer to similar elements and in which:

FIG. 2, comprising

DESCRIPTION OF THE EXAMPLE EMBODIMENTS

Figure 1:
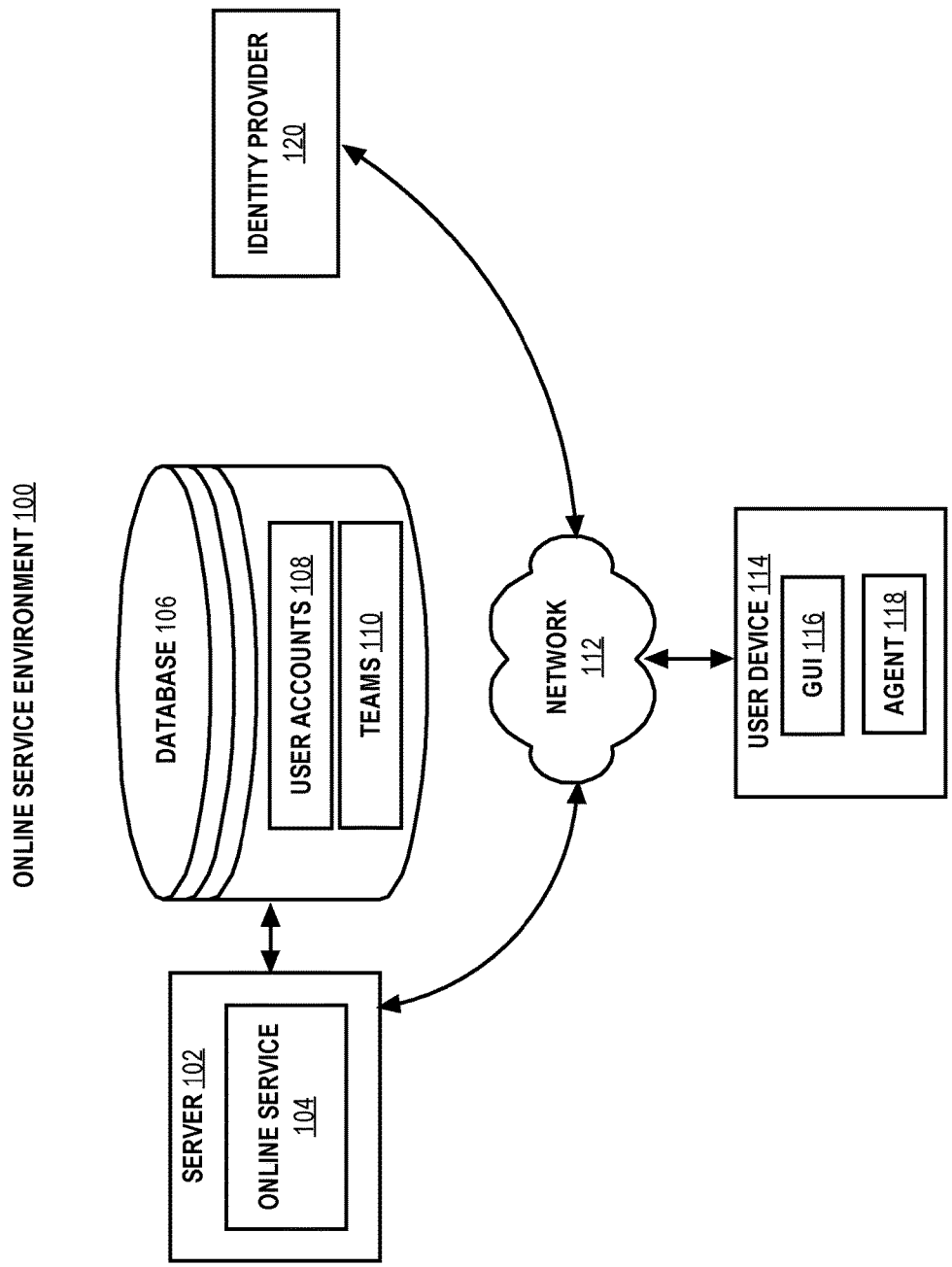
FIG. 1 is a block diagram of an online service environment in which example embodiments of the present invention may be implemented.

In the following description, for the purposes of explanation, numerous specific details are set forth in order to provide a thorough understanding of the example embodiments the present invention. It will be apparent, however, that the example embodiments may be practiced without these specific details. In other instances, well-known structures and devices are shown in block diagram form in order to avoid unnecessarily obscuring the example embodiments.

Further, in the Background section above and in the following description, reference is made in various examples to the fictitious "acme.com" Internet domain and the fictitious Acme Corporation. Such references are for purposes of illustrating the examples only and are not intended to refer to any real Internet domain or any real corporation, business, or other entity.

The following description of the example embodiments is presented according to the following outline:
1.0 GENERAL OVERVIEW
2.0 ONLINE SERVICE ENVIRONMENT
   2.1 INDIVIDUAL AND TEAM ACCOUNTS
   2.2 CONTENT RECEIVING MECHANISMS
   2.3 ONLINE SERVICE AGENT
   2.4 USER AUTHENTICATION
3.0 INVITE ENFORCEMENT
   3.1 AN EXAMPLE USE CASE
   3.2 PROVING OWNERSHIP OF AN INTERNET DOMAIN
   3.3 OWNED DOMAINS LIST
   3.4 CONFIGURING A TEAM FOR INVITE ENFORCEMENT
   3.5 RETROACTIVE INVITE ENFORCEMENT
   3.6 INVITING A USER TO JOIN A TEAM
   3.7 PLACEHOLDER TEAM ACCOUNTS
   3.8 RESTRICTING INDIVIDUAL USER ACCOUNTS
   3.9 PRESENTING THE INVITATION
   3.10 MIGRATING THE INDIVIDUAL USER ACCOUNT
   3.11 LIFTING PLACEHOLDER STATUS
   3.12 ALTERNATIVE MIGRATION
   3.13 DURABLE TEAM MEMBER IDENTIFIER
4.0 DOMAIN CAPTURE
   4.1 INVISIBLE TEAM ACCOUNTS
   4.2 NEW USERS
   4.3 THROTTLING DOMAIN CAPTURE 1.0 General Overview Techniques are described for invite enforcement and domain capture in the context of an online service. The techniques provide an owner of an Internet domain a level of control over how e-mail addresses belonging to that domain are used by users of the online service.

According to one technique referred to herein as "invite enforcement," an owner can invite a user at an e-mail address owned by the owner to join a "team" of users that is under management of the owner. To use the e-mail address with the online service, the user must accept the invitation. Upon accepting the invitation, the e-mail address is associated with a "team" account that is a member of the team and under the management of the owner. If, prior to accepting the invitation, the e-mail address is associated with a personal account of the user, then the user is given the option of converting the personal account to the team account or changing the e-mail address associated with the personal account to one provided by the user that is not owned.

According to another technique termed "domain capture" herein, an owner can capture some or all usage with an online service of e-mail addresses belonging to an Internet domain of the owner.

In one aspect of domain capture, when a user attempts to create a personal account with the online service using an e-mail address that belongs to an owned Internet domain, the user is prompted to create a team account under the management of the owner. To use the e-mail address with the online service, the user must create the team account. Before or after creating the team account, the user may also be presented the option of creating a separate personal account that is associated with an e-mail address provided by the user that is not owned.

In another aspect of domain capture, when a user attempts to use the online service under a personal account that is associated with an e-mail address that belongs to an owned Internet domain, the user is prompted to join a team of users that is under management of the owner. To continue using the e-mail address with the online service, the user must join the team. Upon joining the team, the e-mail address is associated with a "team" account that is a member of the team and under the management of the owner. When prompting the user to join the team, the user is given the option of converting the personal account to the team account or changing the e-mail address associated with the personal account to one provided by the user that is not owned.

These and other aspects of invite enforcement and domain capture are described in greater detail below with reference to the Drawings.

2.0 Online Service Environment

FIG. 1 illustrates a possible online service environment 100 in which the example embodiments may be implemented. However, the example embodiments are not limited to being implemented in online service environment 100. Instead, online service environment 100 is provided as merely one example of an online service environment in which the example embodiments may be implemented, and the example embodiments may be implemented in any online service environment capable of supporting the invite enforcement or the domain capture techniques described herein.

Environment 100 includes a server 102 that provides an online service 104 over a network 112 (e.g., the Internet) to a user of a user device 114. The online service 104 may be implemented as one or more computer programs that execute on the server 102. The server 102, itself, may be implemented as multiple server computing devices, possibly geographically distributed over multiple data center or other hosting facilities. For example, a server computing device may have hardware components like those of basic computing device 1600 described below and be configured with a software system like system 1700 described below. In this case, the online service 104 (or portions thereof) may be implemented as one or more applications 1702 within the software system(s) 1700 on one or more computing devices 1600.

The online service 104 may be one of many different types of online services. For example, online service 104 can be a content item management service, a content collaboration service, a social networking service, a messaging service, or other type of online service. The operator of the online service 104 can generate revenue based on one or more of a variety different business models including, but not limited, a brokerage, advertising, infomediary, merchant, manufacturer, affiliate, subscription, or utility-based business model. According to some example embodiments of the present invention, online service 104 can be any online service that supports at least two different types of user accounts: (1) personal or individual accounts, and (2) team or group accounts.

2.1 Individual and Team Accounts

A team or group account (referred to hereinafter as just a "team account") is a user account 108 that is a member of a team or group (referred to hereinafter as just a "team"). A team 110 is a set of one or more user accounts 108 that are members of the team and under common administration. For example, one or more of the team accounts of a team may have administrative privileges for the team that allow a user with access to that team account to set and configure access controls and privileges with respect to the online service 104 for individual team accounts that belong to the team or for all team accounts of the team. On the other hand, a personal or individual account (referred to hereinafter as just an "individual account") may be a user account 108 that is not a team account.

A database 106 accessible to server 102 may store user accounts 108 and teams 110. Database 106 may be implemented as multiple databases, and possibly even multiple different types of databases accessible to server 102 (e.g., relational database, distributed key-value store, distributed file system, etc.)

User accounts 108, including individual and team accounts, may be stored in database 106. Each user account 108 may be associated in the database 106 with an e-mail address and a user account identifier, among other information. Both an e-mail address and a user account identifier associated with a user account 108 may uniquely identify the user account in the database 106. For example, the user account identifier may be used internally within the online service 104 to identify the user account while the e-mail address may be used externally (e.g., by users of the online service 104) to refer to the user account.

Using both an e-mail address and a user account identifier to uniquely identify a user account 108 allows changes to one to be decoupled from changes to the other. For example, the user account identifier associated with a user account 108 may be changed (e.g., rotated) periodically for security reasons while the e-mail address associated with the user account remains unchanged. Similarly, the e-mail address associated with a user account 108 may change (e.g., at a user's request) and the same user account identifier may be used to identify the user account before and after the change.

Each team 110 in database 106 may be associated with a team name (e.g., "Acme Skunk Works"). For example, the team name may be provided by a user when creating the team. Each team 110 may also be associated with identifiers of the user accounts that are currently members of the team. For example, the team accounts of a team 110 may be identified by the user account identifiers of the user accounts that are currently members of the team.

2.2 Content Receiving Mechanisms

A user of the online service 104 may interact with the online service 104 via a graphical user interface (GUI) 116 at a user device 114. For example, the GUI 116 may be displayed on an electronic video display of or operatively coupled to the user device 114. Such user interaction may include viewing content (e.g., text, images, graphics, video, audio, etc.) provided by the online service 104 over the network 112 to the user device 114 and presented in the GUI 116. For example, the content may be presented on a web page in web browser window of the GUI 116. As another example, the content may be presented in GUI 116 by a mobile application, if user device 114 is a mobile device such as a smart phone or a tablet computing device. Yet another example, the content may be presented in GUI 116 as a pop-up notification, desktop notification, taskbar notification, or other passive notification provided via an operating system of the user device 114.

The user device 114 may receive content provided by the online service 104 from network 112 according to various different content receiving mechanisms. According to one content receiving mechanisms, the user device 114 receives content provided by the online service 104 from network 112 in an electronic message (e-mail message) or text message sent to a user of the user device 114. For example, the e-mail message or text message may invite a user to join a team 110 as described in greater detail herein.

According to another content receiving mechanism, the user device 114 receives content provided by the online service 104 from network 112 in a network response to a network request from the user device 114. For example, the user device 114 may receive content provided by the online service 104 from network 112 in a Hyper Text Transfer Protocol (HTTP) or Secure-Hyper Text Transfer Protocol (HTTPS) response to a HTTP or HTTPS request from the user device 114 to sever 102.

According to yet another content receiving mechanism, the user device 114 receives content provided by the online service 104 from network 112 in a push notification sent by a push notification service (e.g., a third-party push notification service) or other content push mechanism whereby the user device 114 receives content provided by the online service 104 from network 112 not in a response to a request for the content from the user device 114 and not in an e-mail message or text message.

2.3 Online Service Agent

In some cases, an agent 118 (e.g., one or more computer programs) of the online service 104 may be installed and operate at the user device 114. The agent 118 may perform various online service functions automatically, depending on the type of the online service 104. For example, if the online service 104 is a content management service, then the agent 118 may automatically synchronize content items (e.g., files and folders) stored at the user device 114 with content items stored on the server 102 (or with content items stored at other user devices) when those content items are changed at either the user device 114 or the server 104 (or other user devices).

In addition to a web browser application or a mobile application on the user device 114, the agent 118 may also present content in GUI 116. For example, agent 116, either automatically in response to detecting an event or in response to receiving user input, may present content in GUI 116. In some cases, content presented by the agent 118 in GUI 116 is received over the network 112 via one of the content receiving mechanisms described above. In other cases, content presented by the agent 118 in GUI 116 is content that the agent 118 is pre-configured with. For example, the agent 118 may be pre-configured with content when installed on the user device 114.

When presenting content in GUI 116, the agent 118 may cause the content to be presented in the GUI 116 by invoking an application programming interface (API) offered by an operating system of the user device 114. For example, the agent 118 may use the API to cause a pop-up notification, passive notification, taskbar notification, or other notification bubble to be displayed in GUI 116 that presents content. Alternatively, the agent 118 may automatically launch a web browser application, or a mobile application of the user device 114, if the user device 114 is a mobile device, and command the application to present content in GUI 116.

User interaction with online service 104 may also include the user providing user input via GUI 116 which is then packaged as network requests that are sent over network 112 to the server 102. The online service 104 then processes the network requests and returns appropriate responses to the user device 114. The user input may encompass, for example, text input provided by the user via a physical keyboard or a soft-keyboard on a touch screen interface and item selections provided by the user via a pointing device or a touch gesture on a touch screen interface.

While environment 100 as depicted in FIG. 1 includes only one user device 112, environment 100 may include many user devices and many associated users. For example, online service 104 may serve millions of users or more using a corresponding number of user devices.

2.4 User Authentication

In order to access the online service 104 (or certain services thereof), users may need to first authenticate with the online service 104. Users may authenticate with the online service 104 using native authentication or via an identity provider 120 that the online service 104 has partnered with.

With native authentication, a user may authenticate with the online service 104 by providing valid authentication credentials associated with a user account 108. For example, a user of user device 114 may authenticate with the online service 104 by providing to online service 104, via GUI 116 and network 112, an e-mail address that is associated with a user account 108 and the password that is associated with that user account. In this case, if the user does not provide the correct password, then the user is not authenticated and cannot access the online service 104 (or certain services thereof) with the privileges of that user account. In the case of native authentication, the online service 104 maintains authentication credentials (e.g., passwords). For example, each user account 108 enabled for native authentication may be associated in database 106 with a password for that user account.

A user account 108 that is not enabled for native authentication may be enabled for authentication via an identity provider 120. In this case, the online service 104 may not maintain user credentials for the user account, if the user account is not enabled for native authentication. However, a user account 108 may be enabled for both native and identity provider authentication, allowing the user to choose the method of authentication when authenticating with the online service 104. It should also be noted that the manner of authentication for a team account can be one of the administrative options that is configurable by an administrator of the team of which the team user account is a member. For example, a team administrator may configure some or all team accounts of the team as enabled for native authentication, identity provider authentication, or both native and identity provider authentication.

When a user authenticates with the online service 104 via an identify provider 120, the user, using a user agent (e.g., a web browser application or a mobile application), provides to the online service 104 an e-mail address associated with a user account 108 that is enabled for identity provider authentication. The online service 104 then redirects the user agent to the identity provider 120. The identity provider 120 prompts the user via the user agent to provide valid authentication credentials. These credentials may come in the form of a valid username and password combination, for example. If the identity provider 120 successfully authenticates the user provided authentication credentials, then an authentication token is provided by the identity provider 120 to the online service 104 which the online service 104 uses to authenticate the user.

The above-described online service environment is presented for purpose of illustrating the basic underlying computing environment that may be employed for implementing the example embodiments. The example embodiments, however, are not necessarily limited to any particular online service or online service environment. Instead, the example embodiments may be implemented in any type of online service environment that one skilled in the art, in light of this disclosure, would understand as capable of supporting the features and functions of the example embodiments presented herein.

3.0 Invite Enforcement

3.1 An Example Use Case

It may be the case that a number of users of the online service create an individual user account with the online service using an owned e-mail address. For example, an employee "George" of the Acme Corporation may create an individual user account with the online service that is associated with the owned e-mail address "george@acme.com". Here, assuming the Acme Corporation is the direct or indirect registrant of the Internet domain "acme.com", the e-mail address "george@acme.com" is owned by the Acme Corporation, and not George.

In some cases, an employee may create an individual user account with the online service using an owned e-mail address without the knowledge of the owner or with only tacit approval by the owner. For example, George may create an individual user account associated with the "george@acme.com" e-mail address to collaborate with other co-workers (e.g., share files) using the online service. This may be done without explicit approval from his employer, Acme Corporation, the owner of the e-mail address. Nonetheless, the employer may tacitly approve George's use of the e-mail address with the online service because use of the online service increases George's work productivity. The individual user account that George creates with the online service may be a free account with the online service, an account that George pays for, or an account that his employer (Acme Corporation) pays for.

At some point, however, an owner of an e-mail address that is currently associated with an individual user account may wish to migrate the user at the e-mail address to a team user account under the administration of the owner. For example, Acme Corporation may want George to use the "george@acme.com" e-mail address with a team account that is a member a team under the administration of a representative of the Acme Corporation. For example, the team administrator may be George's boss at Acme Corporation.

One reason an owner of an e-mail address may wish to migrate the user at the e-mail address to a team user account is to provide a central point of access control. For example, if the online service is a content management service that provides document file sharing features, the owner may want to ensure that sensitive document files are only shared among certain user accounts. A team can provide a central point of access control configuration such that all team accounts that are members of the team are bound by access controls placed on the team, as opposed to requiring access controls be placed on individual user accounts, which may not be practical without coordination and cooperation of the users of the individual user accounts. For example, the owner (or an authorized representative thereof) may be able, using the online service, to associate the sensitive document files with a team and configure the team such that the sensitive document files can be shared only among team accounts of the team and not with any user account that is not a member of the team. A team may provide other centralized access controls that are applied to members of the team including team-wide auditability, reporting, and restricting the user devices from which the team accounts can be accessed (e.g., only from work computers).

Another reason an owner of an e-mail address may wish to migrate a user to a team account is that the team account may provide a greater level of service to the user. Further, the owner may be paying the operator of the online service for the additional level of service. For example, the user may have access to additional or better features of the online service when using a team account than when using an individual user account. For example, if the online service is a content management service, a team account may provide the user with greater storage capacity for storing files on servers operated by the content managing service.

While an owner may wish to migrate a user at an owned e-mail address to a team account, the user may have already associated personal information with an individual user account associated with the owned e-mail address. For example, the user may have used the online service to associate personal photos, documents, files, or other personal information with the individual user account. Even if the user is willing to migrate the individual user account to a team account, the user may wish to retain control over any existing personal information associated with the individual user account and not bring this personal information under the management of the team.

To address the interests of the owner and the user in the example use case and other use cases, a technique for invite enforcement may be implemented by the online service. FIG. 2, comprising FIG. 2A, FIG. 2B, FIG. 2C, and FIG. 2D, is a flowchart of operations 200 that may be performed to implement invite enforcement in an online service environment, according to some example embodiments of the present invention. Some of the operations are performed by an online service in an online service environment such as, for example, online service 104 in online service environment 100.

3.2 Proving Ownership of an Internet Domain

Initially, the owner of an Internet domain proves (Operation 202) ownership of the Internet domain to the online service. For example, the owner or an authorized representative of the owner may sign an affidavit stating that the owner is the direct or direct registrant of the Internet domain. For example, a representative of the Acme Corporation may sign an affidavit stating that the Acme Corporation is the direct registrant of the "acme.com" Internet domain.

In addition, or alternatively, the owner may prove ownership of the Internet domain based on the existence of a public record that shows that the owner is the direct or indirect registrant of the Internet domain. For example, a WHOIS query may be performed according to the WHOIS protocol (e.g., Request for Comments (RFC) 3912), the answer to which indicates that the owner is the direct or indirect registrant of the Internet domain. For example, the answer to a WHOIS is query for "acme.com" may indicate that Acme Corporation is the direct or indirect registrant of the "acme.com" Internet domain.

3.3 Owned Domains List

Once the owner has proved ownership of the Internet domain, the online service may add (Operation 204) the owned Internet domain (or one or more sub-domains thereof) to an "owned domains list" that the online service maintains. For example, the online service may maintain the owned domains list in a database (e.g., 106). The owned domains list is a list or set of "owned domains." An owned domain can be an Internet domain that an owner has proved ownership of to the online service. For example, the "acme.com" Internet domain may be listed in the owned domains list for the online service if the Acme Corporation has proved ownership of the "acme.com" Internet domain to the online service. An owned domain can also be a sub-domain of an owned Internet domain. For example, "research.acme.com," "sales.acme.com," and "marketing.acme.com" are all sub-domains of the "acme.com" Internet domain.

While in some example embodiments the owned domains list includes only Internet domains that have one domain name level below a top-level Internet domain (e.g., ".com," ".net," ".org," ".edu," ".gov," etc.), the owned domains list includes sub-domains of Internet domains that have multiple domain name levels below a top-level Internet domain in other example embodiments. For example, the Acme Corporation may prove ownership of the "acme.com" Internet domain but choose to have only the "sales.acme.com" and the "research.acme.com" sub-domains listed in the owned domains list. A reason for doing this could be that an owner of an Internet domain may want the online service to apply invite enforcement to only certain sub-domains of an Internet domain that it owns. For example, the Acme Corporation may want the online service to apply invite enforcement to only the "sales.acme.com" and the "research.acme.com" sub-domains but not to the "acme.com" Internet domain or other sub-domains of the "acme.com" Internet domain. In this case, the "sales.acme.com" and the "research.acme.com" sub-domains may appear in the owned domains list but the "acme.com" Internet domain may not appear in the owned domains list. As a result, the "sales.acme.com" or the "research.acme.com" sub-domains would be subject to invite enforcement but the "marketing.acme.com" sub-domain, for example, and the "acme.com" Internet domain would not be subject to invite enforcement.

3.4 Configuring a Team for Invite Enforcement

An owned domain in the owned domains list may be associated (Operation 206) by the online service with a team (e.g., 110). The online service may maintain the association in a database (e.g., 106) of the online service. For example, the database association may be between an identifier of the team and one or more owned domains (or one or more identifiers thereof).

According to some example embodiments of present invention, when an owned domain is associated with a team, an invitation to join the team, made via the online service to an e-mail address that belongs to the owned domain, is subject to invite enforcement. An e-mail address may belong to an owned domain if the domain of the e-mail address is the same as the owned domain. For example, the e-mail address "george@acme.com" belongs to the domain "acme.com." An e-mail address may also belong to an owned domain if the domain of the e-mail address is not the same but within (i.e., a sub-domain of) the owned domain. For example, the e-mail address "bob@sales.acme.com" belongs to both the "sales.acme.com" sub-domain and the "acme.com" Internet domain.

According to some example embodiments of the present invention, an administrator of a team uses the online service to associate an owned domain with the team. For example, the administrator may select, in a GUI presented at a user device of the team administrator, an owned domain to associate with the team. The GUI may include content provided by the online service and received at the administrator's user device via a content receiving mechanism. Once the selection is made, the selection may be conveyed from the administrator's user device over a network to the online service which then creates the association between the team and the selected owned domain in the database.

The set of owned domains that the administrator can select from to associate with the team can be constrained by the online service based on the domain of the e-mail address associated with the administrator's team account. For example, if the administrator's team account is associated with the e-mail address "alice@acme.com," then the online service may allow the administrator to select any of the following owned domains assuming they exist in the owned domains list: "acme.com", "sales.acme.com", or "research.acme.com".

The set of owned domains that the administrator can select from can be further constrained by the online service based the hierarchical domain name relationship between the domain of the e-mail address associated with the administrator's team account and an owned domain. In particular, the online service may restrict the administrator to selecting only an owned domain in the owned domains list that is the same or within the domain of the administrator's team account e-mail address. For example, assuming the owned domains list includes "acme.com," "sales.acme.com," and "research.acme.com" and the e-mail address associated with the administrator's team account is "alice@sales.acme.com," then the online service could allow the administrator to select only "sales.acme.com" to associate with the team but not allow the administrator to select "acme.com" or "research.acme.com."

Figure 3:
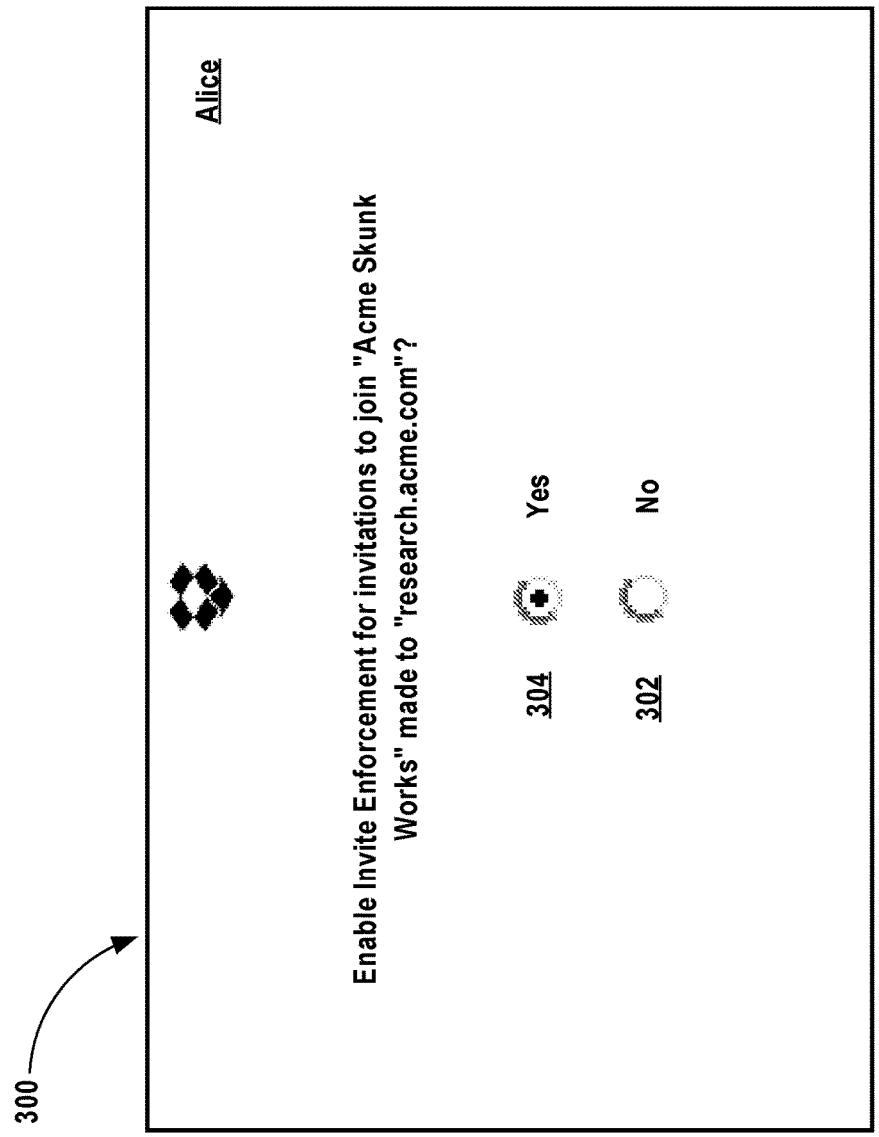
FIG. 3 illustrates a possible graphical user interface for enabling invite enforcement for a team according to some example embodiments of the present invention.

The administrator may also be provided by the online service the option to turn invite enforcement on or off for a particular owned domain associated with a team or for all owned domains associated with the team. For example, FIG. 3 depicts a possible graphical user interface (GUI) 300 that may be presented to an administrator of a team at the administrator's user device (e.g., as part of GUI 116 of user device 114). The GUI 300 may present content provided by the online service and received by the administrator's user device via a content receiving mechanism.

In the example GUI 300, a user "Alice" is an administrator of an "Acme Skunk Works" team. The owned domain "research.acme.com" has been associated by the online service with the team. The GUI 300 allows Alice, the administrator of the team, to command the online service to turn off invite enforcement for the "research.acme.com" domain and the "Acme Skunk Works" team by selecting the "No" radio button 302. Alternatively, Alice can command the online service to turn on invite enforcement for the "research.acme.com" domain and the "Acme Skunk Works" team by selecting the "Yes" radio button 304. When turned on, invitations to join the "Acme Skunk Works" team made to users at e-mail addresses belonging to the "research.acme.com" domain are subject to invite enforcement by the online service. When off, such invitations are not subject to invite enforcement by the online service.

3.5 Retroactive Invite Enforcement

Once an invitation to join a team is made to an owned e-mail address, the invitation may be pending for some time. For example, it may be minutes, hours, days, weeks, or more between the time an invitation is made and the time the invitee takes action on the invitation. The action may include the invitee accepting the invitation, for example. During this time between making the invitation and action on the invitation being taken, the invitation may be considered pending. While an invitation is pending, the administrator of the team may use the online service to turn off invite enforcement or to turn on invite enforcement.

According to some example embodiments, when invite enforcement for an owned domain is switched from off to on, invite enforcement is applied retroactively by the online service to any still pending invitations that were made when invite enforcement was off. This may be facilitated by the online service maintaining a "pending invitation list" for the team in a database (e.g., 106). When an invitation is made to an owned email address, the e-mail address may be added to the pending invitation list for the team along with associated metadata that indicates that the invitation is pending.

The metadata may be updated by the online service when a user at the e-mail address takes action on the invitation (e.g., accepting the invitation) or when the invitation expires.

When invite enforcement for an owned domain is switched from off to on, the pending invitation list for a team may be accessed by the online service for any pending invitations to e-mail address belonging to the owned domain. The pre-acceptance invite enforcement operations of creating a placeholder team account (operation 210) and/or restricting the individual user account (operation 214) described below may then be applied retroactively to the pending invitations. According to some example embodiments, when invite enforcement for a domain associated with a team is switched from on to off, pre-acceptance invite enforcement step(s) are rolled back (undone) for the pending invitations. The administrator may be prompted for confirmation before pre-acceptance steps are rolled back (undone).

3.6 Inviting a User to Join a Team

Figure 4:
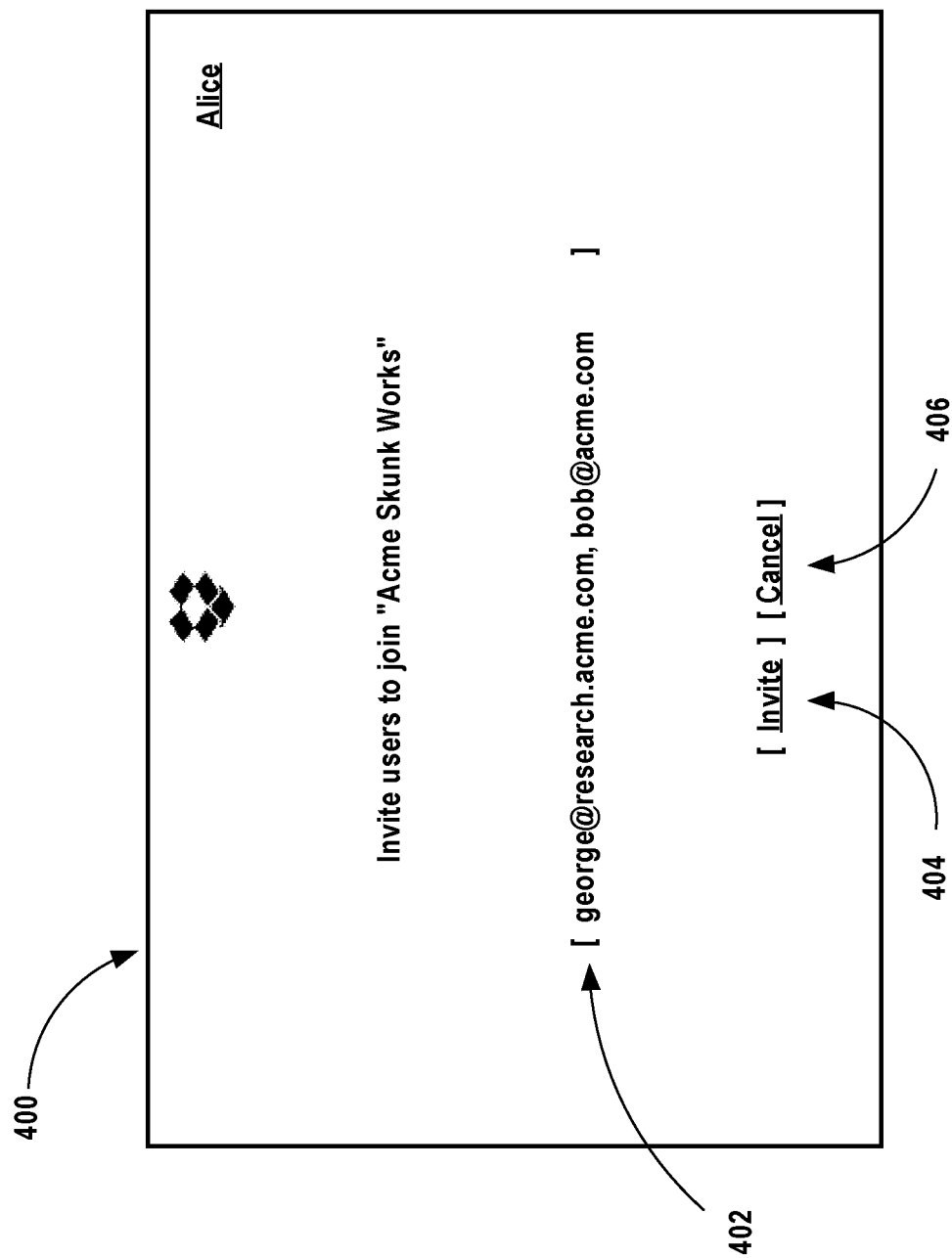
FIG. 4 illustrates a possible graphical user interface for making invitations to join a team according to some example embodiments of the present invention.

An administrator of a team (or other member of the team with the appropriate permissions) may use the online service to invite (Operation 208) a user at an e-mail address to join the team. FIG. 4 depicts an example graphical user interface (GUI) 400 that may be presented at an administrator's user device (e.g., as part of GUI 116 of user device 114). The GUI 400 may include content from the online service received by the administrator's user device via a content receiving mechanism.

In this example, Alice, the administrator of the "Acme Skunk Works" team is able to provide the e-mail addresses of one or more users that Alice wishes to invite to join the team. For this, the GUI 400 provides e-mail address entry field 402. Alice may enter or select one or more e-mail addresses into the e-mail address entry field 402. In this example, Alice has entered or selected two e-mail addresses. After entering or selecting e-mail addresses, Alice may then activate the "Invite" button 404 to invite users at the two e-mail addresses to join the team. Alternatively, Alice may activate the "Cancel" 406 to cancel the invitations.

Once invited, assuming the entered e-mail addresses are not already associated with team accounts and invitations to join the team for the entered e-mail addresses are not already pending, the entered e-mail addresses may be added by the online service to the team's pending invitations list and the metadata of the team pending invitations lists set to indicate that invitations are currently pending for the e-mail addresses.

According to some example embodiments of the present invention, an invitation can have all the following states in the online service, or a subset or a superset thereof: (1) pending, (2) accepted, and (3) expired. An invitation may be pending if it still may be accepted but is not yet accepted. A pending invitation may expire after a period of time at which point it is expired and can no longer be accepted. For example, a pending invitation may expire 48 hours after it is made.

It should be noted that there is no requirement of invite enforcement that an invitation be made to an e-mail address that is already associated with a user account. On the contrary, an invitation may be made an e-mail address that is currently not associated with any user account. Further, not all invitations are necessarily subject to invite enforcement by the online service. For example, an invitation made to an e-mail address that is not an owned e-mail address may not be subject to invite enforcement by the online service. As another example, an invitation made to an owned e-mail address where invite enforcement for the owned domain is turned off may not be subject to invite enforcement by the online service.

3.7 Placeholder Team Accounts

A user at an e-mail address invited to join a team may or may not already have an individual user account with the online service associated with that e-mail address at the time the invitation is made. For example, when Alice invites "george@research.acme.com" and "bob@acme.com" there may or may not already be individual user accounts associated with those e-mail addresses with the online service depending on whether users (e.g., George and Bob) at those e-mail address have already registered with the online service using those e-mail addresses.

According to some example embodiments of the present invention, regardless of whether an individual user account associated with an e-mail address already exists with the online service, when an invitation to join a team made to the e-mail address is subject to invite enforcement by the online service, the online service creates (Operation 210) a "placeholder" team account in a database (e.g., 106). The online service creates the placeholder team account as a member of the team and associates the placeholder team account with the invited e-mail address. Once created, the placeholder team account is a member of the team. Once associated with the e-mail address, other members of the team may interact with the placeholder team account using the e-mail address. In this way, while the invitation is pending, existing team members can still collaborate with a pending team member via their placeholder team account.

Figure 5:
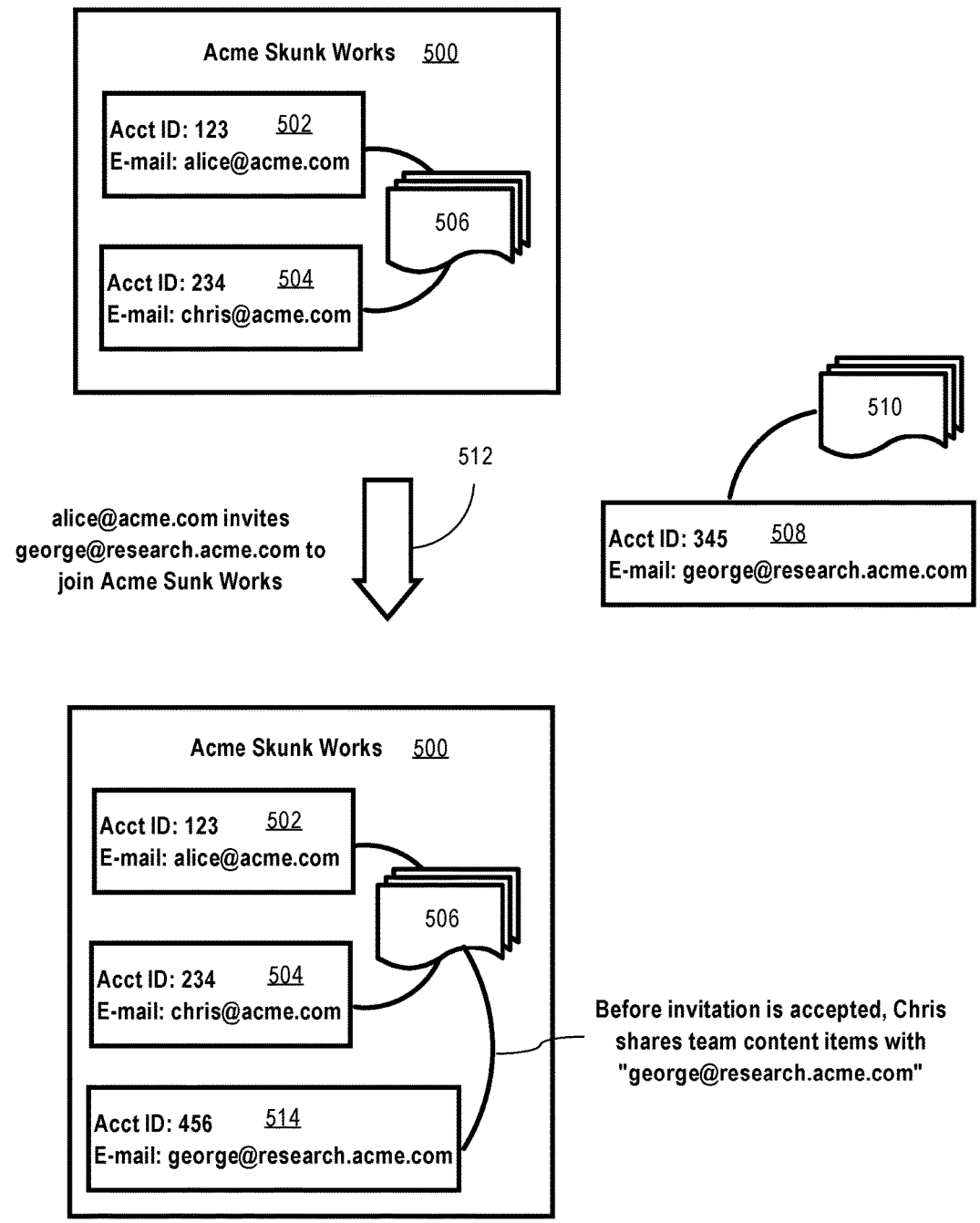
FIG. 5 illustrates an invite enforcement scenario when joining a team according to some example embodiments of the present invention.

An example usage of placeholder team accounts is illustrated in FIG. 5. Initially, the Acme Sunk Works team 500 has two members: (1) team account 502 with user account identifier "123" and associated with e-mail address "alice@acme.com" and (2) team account 504 with user account identifier "234" and associated with e-mail address "chris@acme.com." A set of one or more content items 506 under management of the online service is accessible to both team account 504 and team account 506. That is, the content items 506 are shared via the online service among team accounts 504 and 506. In this example, a content item 506 may be a logical collection of information under management of the online service. A content item 506 may correspond to a known file type. For example, the file type to which a content item 506 corresponds may be an image file type (e.g., .jpg, .tiff, .gif, .png), a music file type (e.g., .mp3, .aiff, .m4a, .wav), a movie file type (e.g., .mov, .mp4, .m4v), a word processing file type (e.g., .doc, .docx, .pages), a presentation file type (e.g., .ppt, .pptx, .key), a spreadsheet file type (e.g., .xls., .xlsx, .numbers), a web page file type (e.g., .htm, .html), a text file types (e.g., .txt), or other file type. A content item 506 may also correspond to other types of user-provided information that can be associated with a user account held with an online service such as, for example, e-mail messages, calendar entries, user comments, social networking status updates, online shopping histories, or any other type of user-provided information under management of the online service and associated with user accounts held with the online service.

At the same time, an individual user account may be held with the online service. In this example, an individual user account 508 has the user identifier "345" and is associated with the e-mail address "george@research.acme.com." The individual user account 508 is also associated in the online service with a set of one or more content items 510. Thus, content items 510 are accessible via the online service only to the individual user account 508. For example, content items 510 may include account 508 holder's personal documents, photos, and files or a mix of personal documents, photos, and files and work-related documents, photos, and files.

Sometime later, Alice, the administrator of the "Acme Skunk Works" team 500, invites 512 "george@research.acme.com" to join the team 500. As a result, the online service creates placeholder team account 514 as a member of the team 500. The placeholder team account 514, like individual user account 508, is associated with the invited e-mail address "george@research.acme.com" but has a different user account identifier. This allows members of the team (e.g., 502 and 504) to interact with team account 514 via the "george@research.acme.com" e-mail address before the user at that e-mail address accepts the invitation to join the team. This interaction can occur even though the individual user account 508 is also associated with the invited e-mail address "george@research.acme.com". This interaction is possible in part because placeholder team account 514 and individual user account 508 have different user account identifiers. As a result, the online service can distinguish between the two accounts using the respective user account identifiers.

For example, after placeholder team account 514 is created by the online service, a user of team account 504 may be able to share content item(s) 506 with placeholder team account 514 using a content item sharing feature of the online service. In doing so, the user of team account 504 may refer to the placeholder team account 514 by the e-mail address "george@research.acme.com."

When a user of the online service refers to a user account by an e-mail address and both a placeholder team account and individual user account associated with that e-mail address exist with the online service, an ambiguity as to which user account the user is referring also exists (i.e., the placeholder team account or the individual user account). For example, after the placeholder team account 514 is created, when a user of team account 504 then shares content items 506 with "george@research.acme.com," the user may be intending to share the content items 506 with placeholder team account 514 or individual user account 508. According to some example embodiments, the online service may resolve the ambiguity automatically. For example, the online service may resolve all references to an e-mail address associated with a placeholder team account to the placeholder team account as opposed to any individual user account associated with that e-mail address. For example, after placeholder team account 514 is created, the online service may resolve all user account references by other users to "george@research.acme.com" to the placeholder user account 514 as opposed to the individual user account 508.

According to some example embodiments, when a reference to an e-mail address associated with a placeholder team account is made by a user of a user account that is not also a member of the team to which the placeholder team account belongs, then the online service does not resolve the reference to the placeholder team account. Instead, the online service may deny the request by the user that included the reference without explaining that the e-mail address is associated with a particular team. This may be done to keep the existence of the team hidden from users using user accounts that are not members of the team. For example, if a user of an individual user account attempts to share content items with "george@research.acme.com" after placeholder team account 514 is created, than the online service may provide content to the user at the user's user device via a content providing mechanism that indicates that the sharing request could not be performed without indicating that "george@research.acme.com" is associated with the placeholder team account 514 or that the Acme Skunk Works team 500 even exists.

3.8 Restricting Individual User Accounts

After an invitation subject to invite enforcement is made, the online service creates a placeholder team account as a member of the team as discussed above with respect to Operation 210. For example, in response to making an invitation to join the Acme Skunk Works team 500 to "george@research.acme.com," the online service creates placeholder team account 514 and associates placeholder team account 514 with the "george@research.acme.com" e-mail address. In addition, according to some example embodiments of the present invention, if the e-mail address is currently associated with an individual user account (Operation 212), then the online service places the individual user account in a restricted state (Operation 214). For example, in response to making the invitation to join the Acme Skunk Works team 500 to "george@research.acme.com," the online service may create placeholder team account 514 as a member of team 500 and place individual user account 508 in the restricted state. An individual user account may remain in the restricted state while the invitation is pending. For example, individual user account 508 may remain in the restricted state until the invitation to join the Acme Skunk Works team 500 is accepted by a user at "george@research.acme.com."

According to some example embodiments, the individual user account remains in the restricted state if the invitation is not accepted and after the invitation has expired. In this case, the individual user account remains in the restricted state until an invitation made to the e-mail address is accepted. For example, a first invitation to join the Acme Skunk Works team 500 made to "george@research.acme.com" causes the individual user account 508 to be placed in the restricted state. If the first invitation expires, the individual user account 508 may remain in the restricted state until a second invitation to "george@research.acme.com" is made and accepted. In this way, a user at an e-mail address associated with an individual user account cannot cause the individual user account to be removed from the restricted state simply by letting an invitation to the e-mail address expire.

According to some example embodiments, when an individual user account is placed in the restricted state, a user at the e-mail address associated with the individual user account is prevented by the online service from using the individual user account with the online service except to accept a pending invitation to a join a team made to the e-mail address. In this way, the user is preventing from accessing and using regular features of the online service under the individual user account with the e-mail address as an identifier of the individual user account. The user may choose to ignore the invitation. However, the user can no longer use the individual user account with the e-mail address with the online service as the individual user account's identifier.

3.9 Presenting the Invitation

Figure 6:
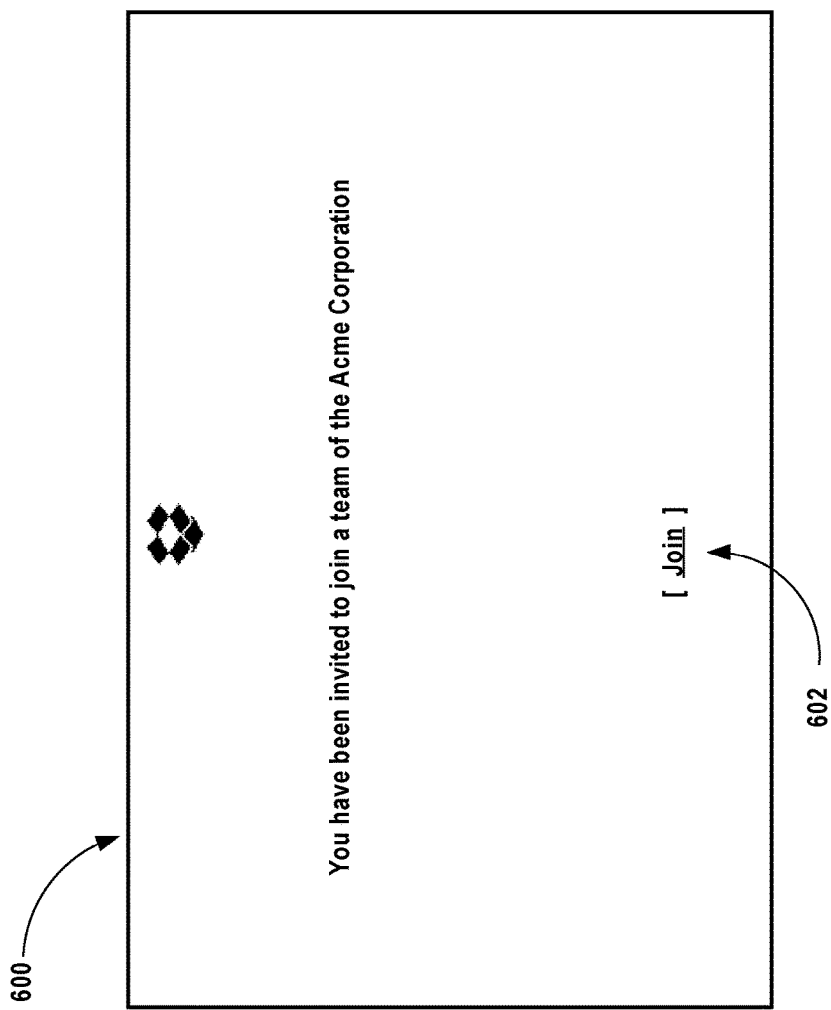
FIG. 6 illustrates a possible graphical user interface for inviting a user to join a team according to some example embodiments of the present invention.

FIG. 6 illustrates a possible graphical user interface 600 that may be presented to a user at an e-mail address to which an invitation to join a team has been made. For example, GUI 600 may be presented to the user as part of Operation 216 in which the user receives an invitation to join a team. For example, the GUI 600 may be presented as part of GUI 116 at the user's user device 114. The GUI 600 may include content from the online service received at the user's user device 114 via a content receiving mechanism. In this example, GUI 600 informs that the user has been invited to join a team associated with the "Acme Corporation." The GUI 600 also provides an actionable "Join" button 602 that the user can activate to join the team. Notably, GUI 600 omits the name of the team (e.g., "Acme Skunk Works") to protect the identity of the team and keep the existence of the team unknown in case the GUI 600 is viewed by a user that does not have access to the individual user account associated with the e-mail address.

Figure 7:
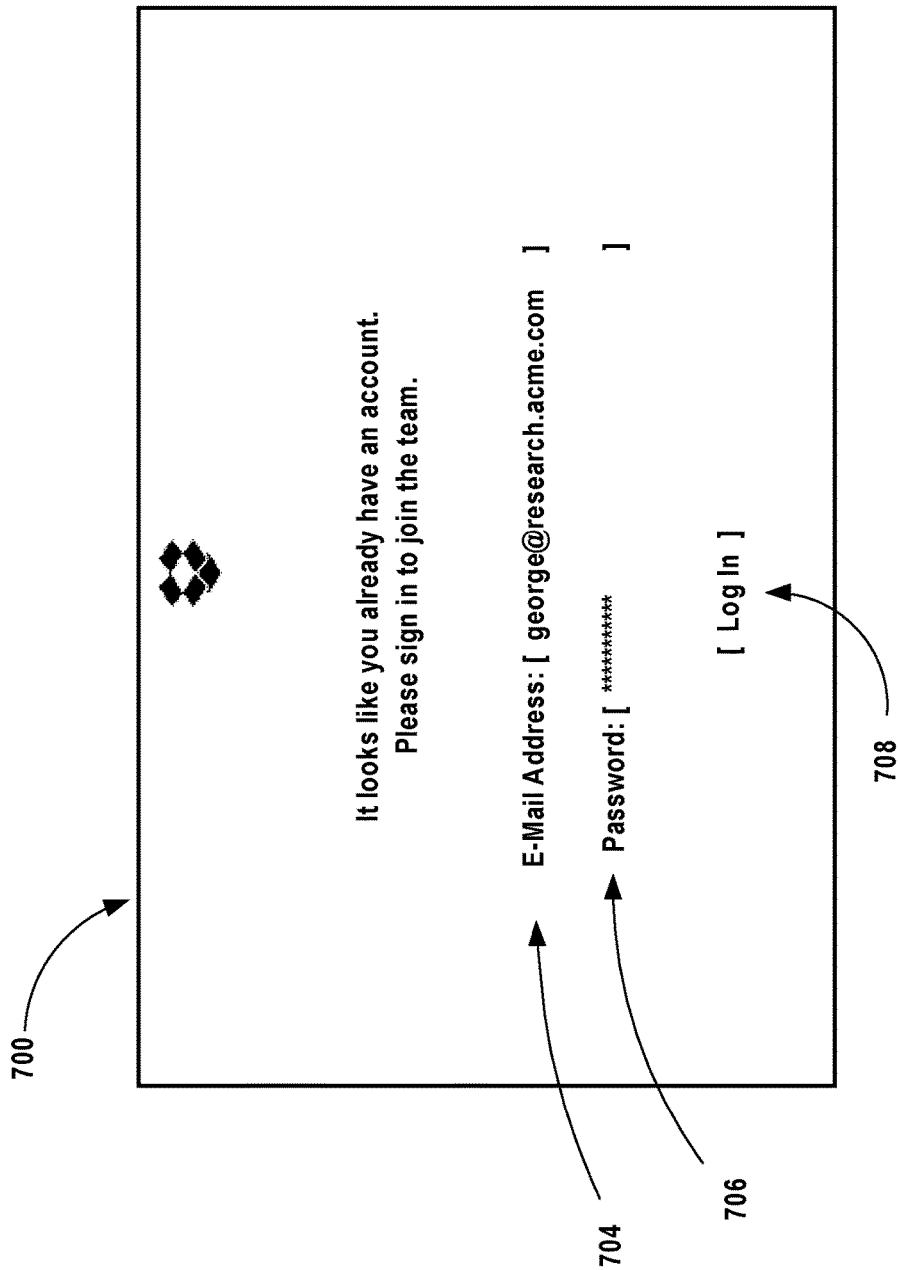
FIG. 7 illustrates a possible graphical user interface for authenticating a user against a user account according to some example embodiments of the present invention.

FIG. 7 illustrates a possible graphical user interface 700 that may be presented to the user after activating the "Join" button 602 of GUI 600. For example, GUI 600 may be presented to the user as part of Operation 218 in which the user attempts to authenticate against the individual user account associated with the invited e-mail address. In particular, GUI 700 prompts the user to authenticate against the individual user account associated with the e-mail address. In this example, GUI 700 prompts the user to authenticate against the individual user account using native authentication by prompting the user to provide the e-mail address and password associated with the individual account. However, GUI 700 could instead prompt for just the e-mail address to use for authentication via an identity provider (e.g., 120). GUI 700 also omits the name of the team in case the user is not the intended invitee in which case the name of the team should not be revealed to the user. According to some example embodiments, the online service requires the user to successfully authenticate against the individual user account associated with the invited e-mail address before the name of the team is revealed. By requiring this, greater assurances are provided by the online service that the team name is revealed only to the intended invitee.

According to some example embodiments, a user is presented with an invitation at their user device after (e.g., in a response to) the next request from the user device to the online service after the user's individual user account has been placed in the restricted state. For example, the next request can be from a web browser application on the user's device to the online service or from an agent (e.g., 118) at the user's device to the online service. The invitation presented may include content from the online service that is received at the user's device via a content receiving mechanism.

According to some example embodiments, the online service maintains a whitelist of request URLs (or portions or expressions thereof) that specify which requests from user devices should trigger the online service to check whether the user's account is the restricted state. The whitelist may contain only a subset of all the request URLs for the online service. As a result, a user may be able to obtain content from the online service (e.g., a home page of the online service) for some requests even when the user's individual user account is in the restricted state. This may be an acceptable trade off to avoid the performance penalty of checking whether the requestor's individual user account is in the restricted state for every request of the online service. According to some example embodiments, the whitelist includes request URLs that cover all user requests that the online service requires the user to assert their user account identity in order to access content at the requests. For example, the whitelist may include request URLs (or portions or expressions thereof) that cover all requests by users to access content items associated with their user accounts. In this case, the whitelist may omit request URLs for public content accessible to all users, including unauthenticated users.

3.10 Migrating the Individual User Account

According to some example embodiments, if the user successfully authenticates against the individual user account (Operation 220), then the online service requires the user to select (Operation 222) a migration option for the individual user account. According to some example embodiments, two migration options are provided by the online service: (1) migrate the individual user account to the team, or (2) migrate the individual user account to a new individual user account that the user creates using an unowned e-mail address.

If (Operation 224) migration option (1) is selected by the user at Operation 222 ("Team Account" branch from Operation 224), the online service associates (Operation 226) any personal content (e.g., content items 510) associated with the individual user account associated with the invited e-mail address (e.g., individual user account 508) with the placeholder team account (e.g., 514) associated with the invited e-mail address.

If (Operation 224) migration option (2) is selected by the user at Operation 222 ("New Individual Account" branch from Operation 224), the online service prompts the user to create (Operation 228) a new individual user account using an e-mail address that is not owned. Further, the online service associates (Operation 230) any personal content (e.g., content items 510) associated with the individual user account associated with the invited e-mail address (e.g., individual user account 508) with the new individual user account.

In both migration cases, the online service deletes or deactivates (Operation 232) the individual user account associated with the invited e-mail address.

Figure 8:
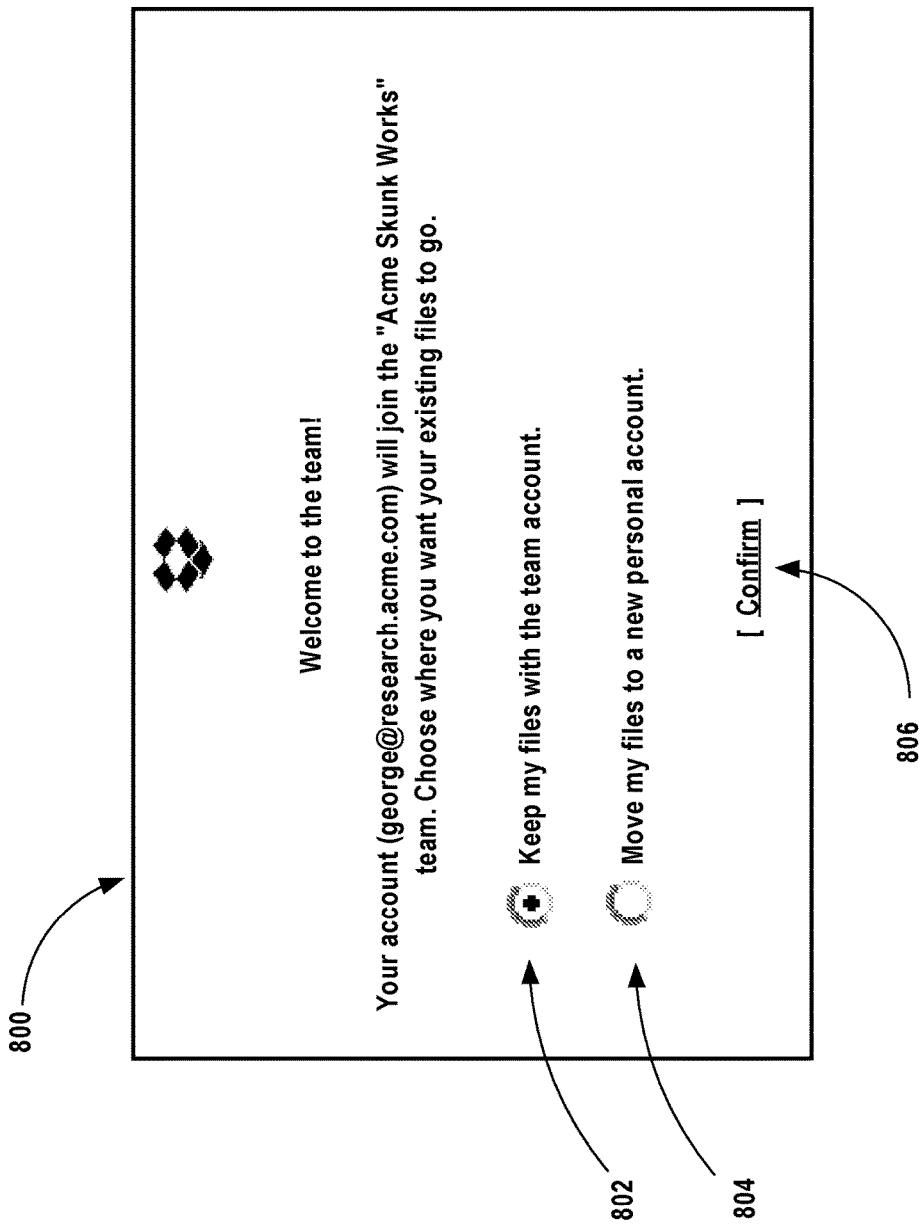
FIG. 8 illustrates a possible graphical user interface for selecting a migration option for an individual user account when joining a team according to some example embodiments of the present invention.

FIG. 8 illustrates a possible GUI 800 that may be presented to the user after the user successfully authenticates against the individual user account associated with the invited e-mail address as part of Operations 218 and 220. If the online service at Operation 220 determines that the user was not successfully authenticated (e.g., did not provide the correct password), then the user may be prompted again for the correct authentication credentials at Operation 218. Assuming the user is successfully authenticated, GUI 800 allows the user to choose one of the two migration options for the individual user account associated with the invited e-mail address. For example, GUI 800 may be presented as part of Operation 222 in which the user selects one of the two migration options.

Figure 9:
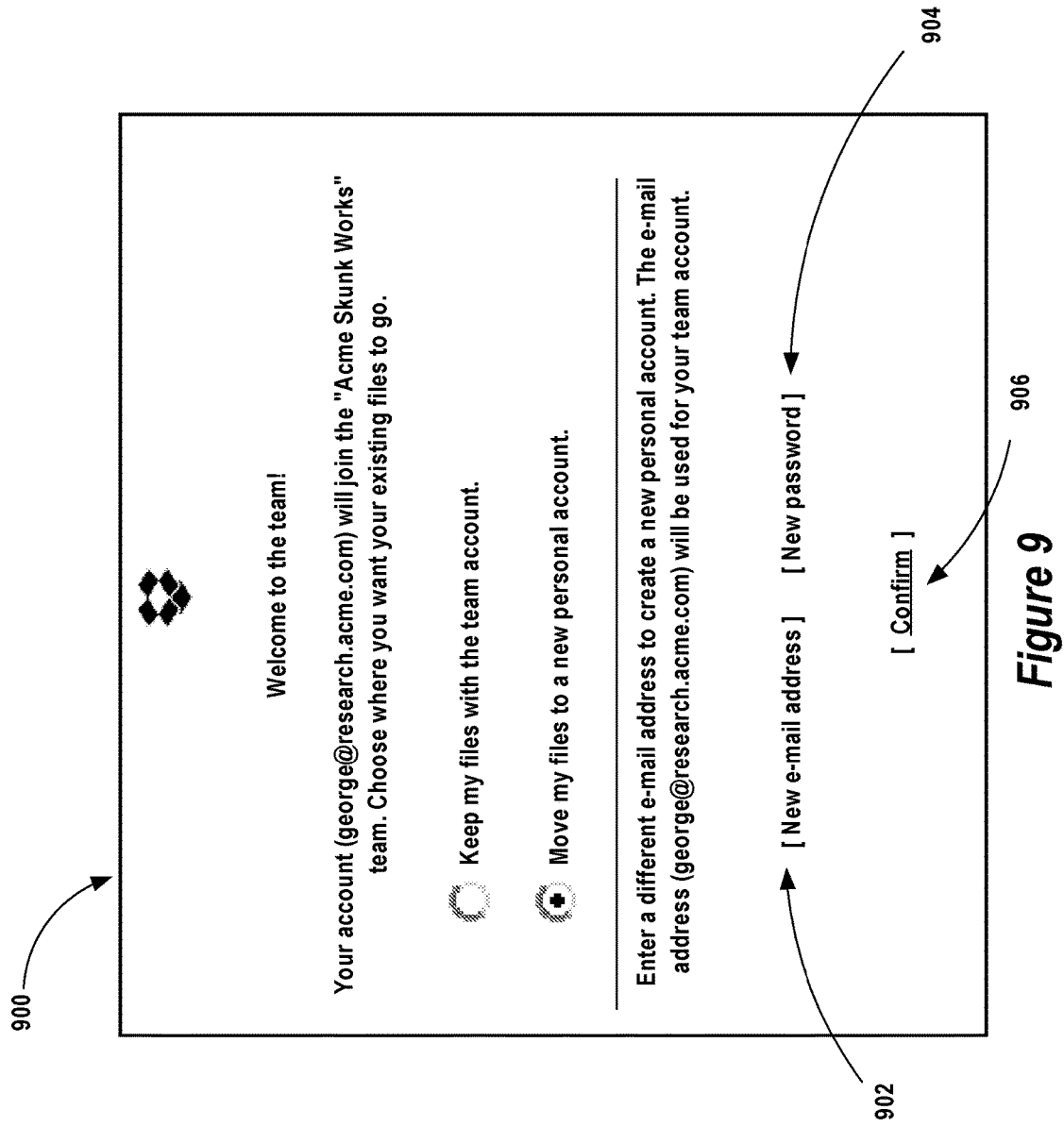
FIG. 9 illustrates a possible graphical user interface for creating a new individual user account when joining a team according to some example embodiments of the present invention.

For example, assuming the individual user account subject to invite enforcement is account 508 of FIG. 5, if the user selects option 802 and then activates the confirm 806 button in GUI 800 as part of Operation 222, then the online service associates content items 510 with placeholder team account 514 as part of Operation 226 and deactivates or deletes individual user account 508 as part of Operation 232. If, on the other hand, the user selects option 804 as part of Operation 222, then the online service prompts the user to create a new individual user account using an unowned e-mail address as part of Operation 228. This is shown in FIG. 9 which illustrates a GUI 900 that may be presented to the user after selecting option 804. In particular, additional data entry fields 902 and 904 are provided in GUI 900 that allow the user to provide a new e-mail address and a new password for the new individual user account to be created. After providing a new e-mail address that is not owned and a password for the new account, the user may activate the confirm button 906. In response, the online service may create the new individual user account and associate the new e-mail address with it. Also, the online service may associate the content items 510 with the new individual user account as part of Operation 230 and deactivate or delete the individual user account 508 as part of Operation 232.

3.11 Lifting Placeholder Status

After the user has migrated the individual account to the placeholder team account or a new individual user account, the placeholder status of the placeholder team account is lifted. The placeholder team account then becomes the user's account with the online service associated with the invited e-mail address. It should be noted that Operation 232, deleting or deactivating the individual account, can be performed by the online service before or after Operation 234. If after, then the individual user account may remain in the restricted state until it is deleted or deactivated. After the placeholder status of the team account is lifted, references by users to the e-mail address associated with the team account are interpreted by the online service as references to the team account including when the e-mail address is submitted to the online service for purposes of user authentication. In other words, after the placeholder status of the placeholder team account is lifted, a user can authenticate using the invited e-mail address only against the team account and not against another user account (e.g., the now deleted or deactivated individual user account).

According to some example embodiments of the present invention, lifting (Operation 234) the placeholder status of the team account includes prompting the user to create or change the password associated with the team account, or configuring the team account for authentication via an identity provider.

Figure 2A:
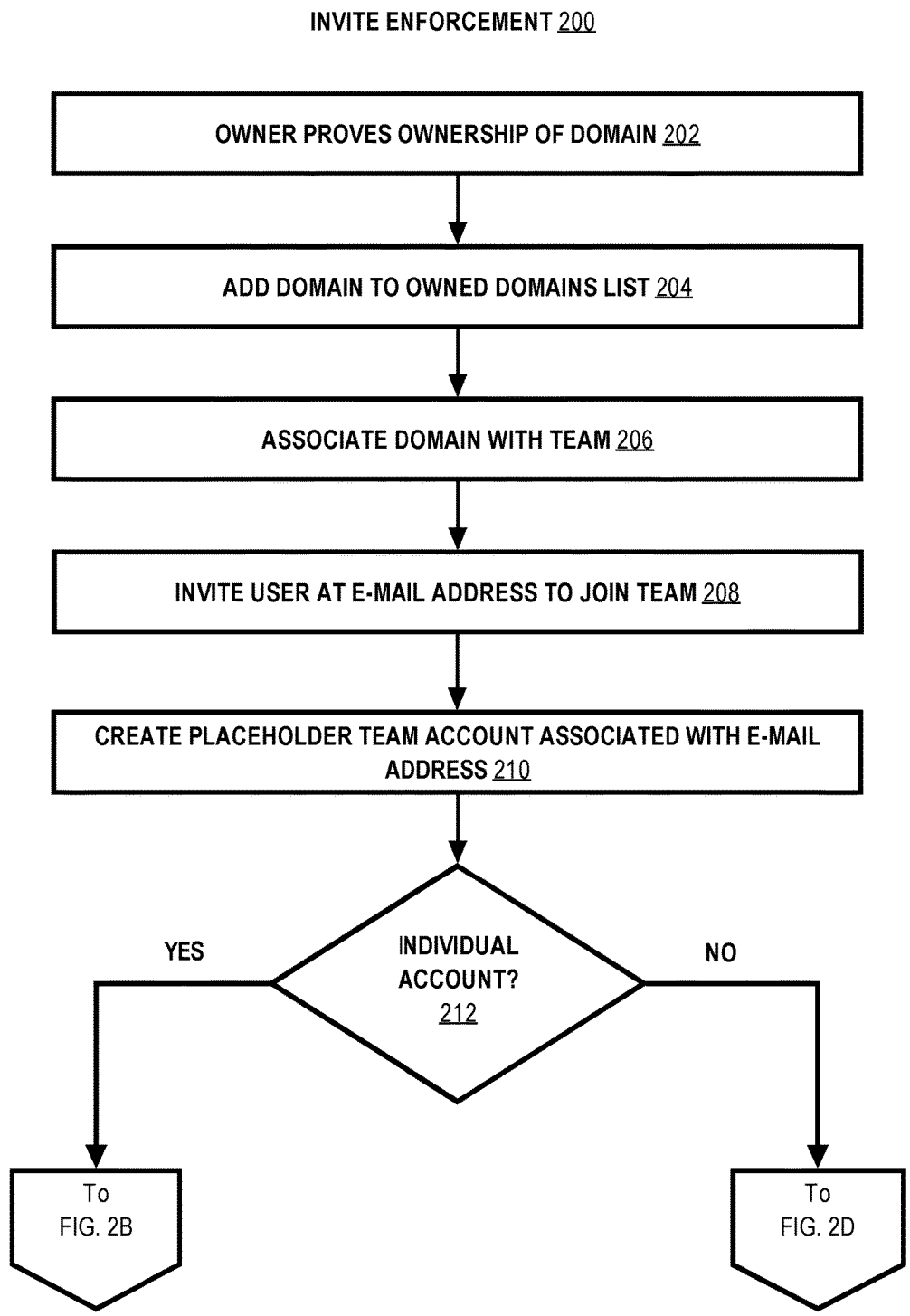
FIG. 2A, FIG. 2B, FIG. 2C, and FIG. 2D, is a flow diagram of a technique for invite enforcement according to some example embodiments of the present invention.
Figure 2B:
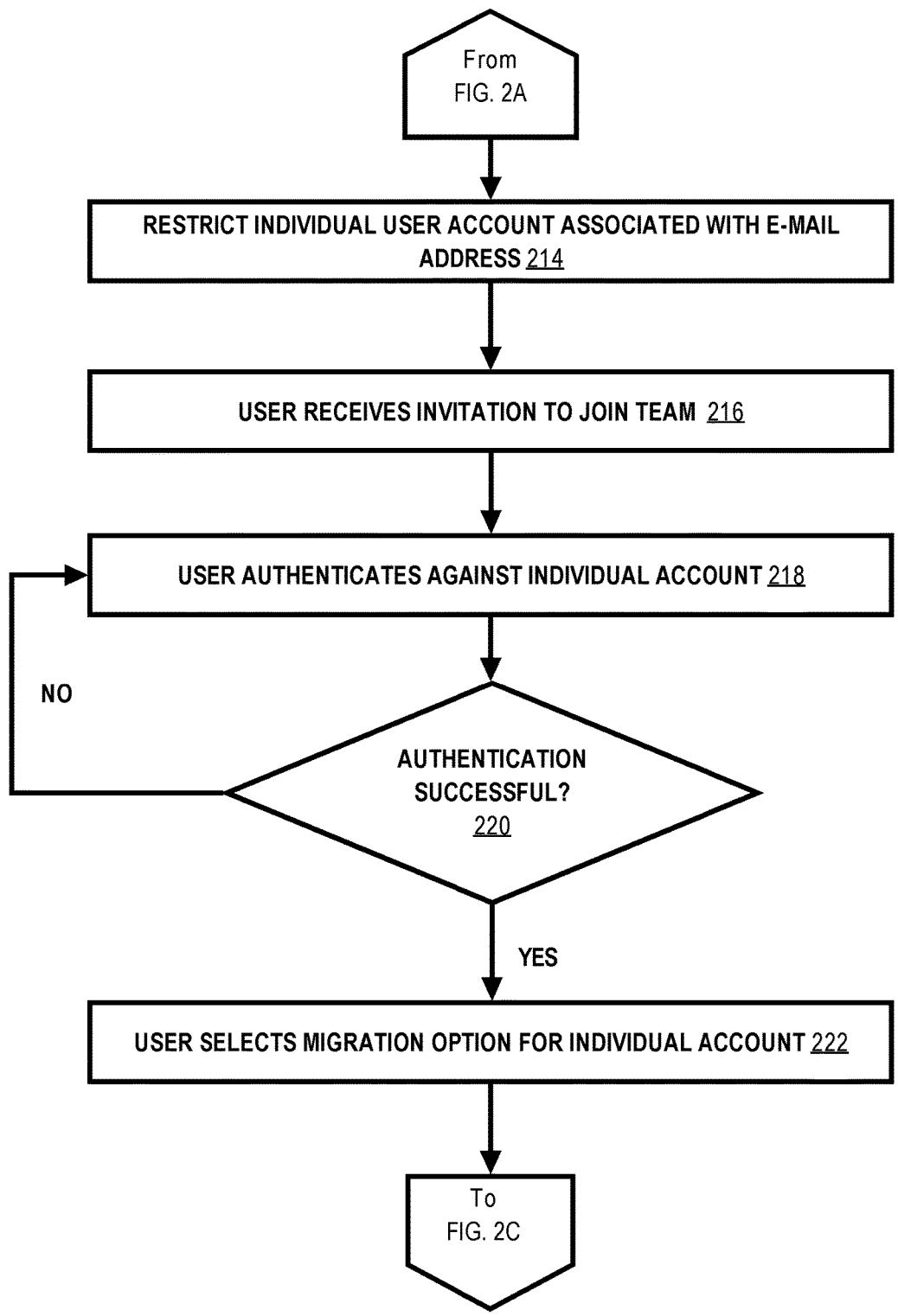
Figure 2C:
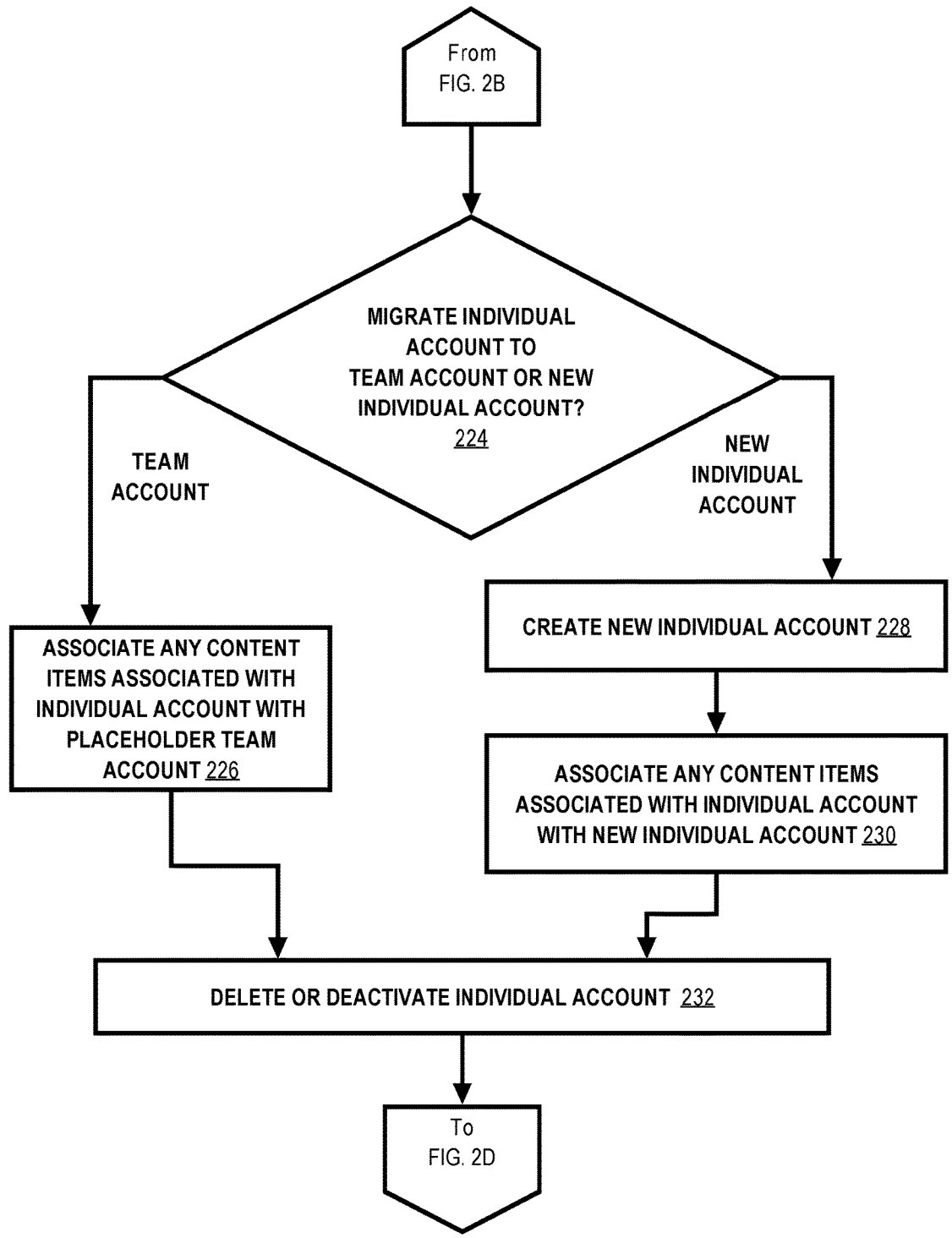
Figure 2D:
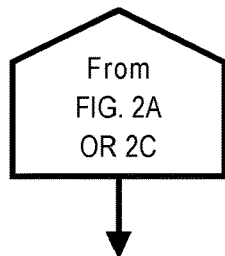

The placeholder status of the team account is also lifted if the user does not have an individual user account with the online service associated with the invited e-mail address ("No" branch of Operation 212 of FIG. 2A). In this case, the user may be prompted by the online service as part of Operation 234 to create a password to associate with the team account, if native authentication will be used to authenticate with the team account or prompted by the online service to configure the team account for identity provider authentication.

Figure 10:
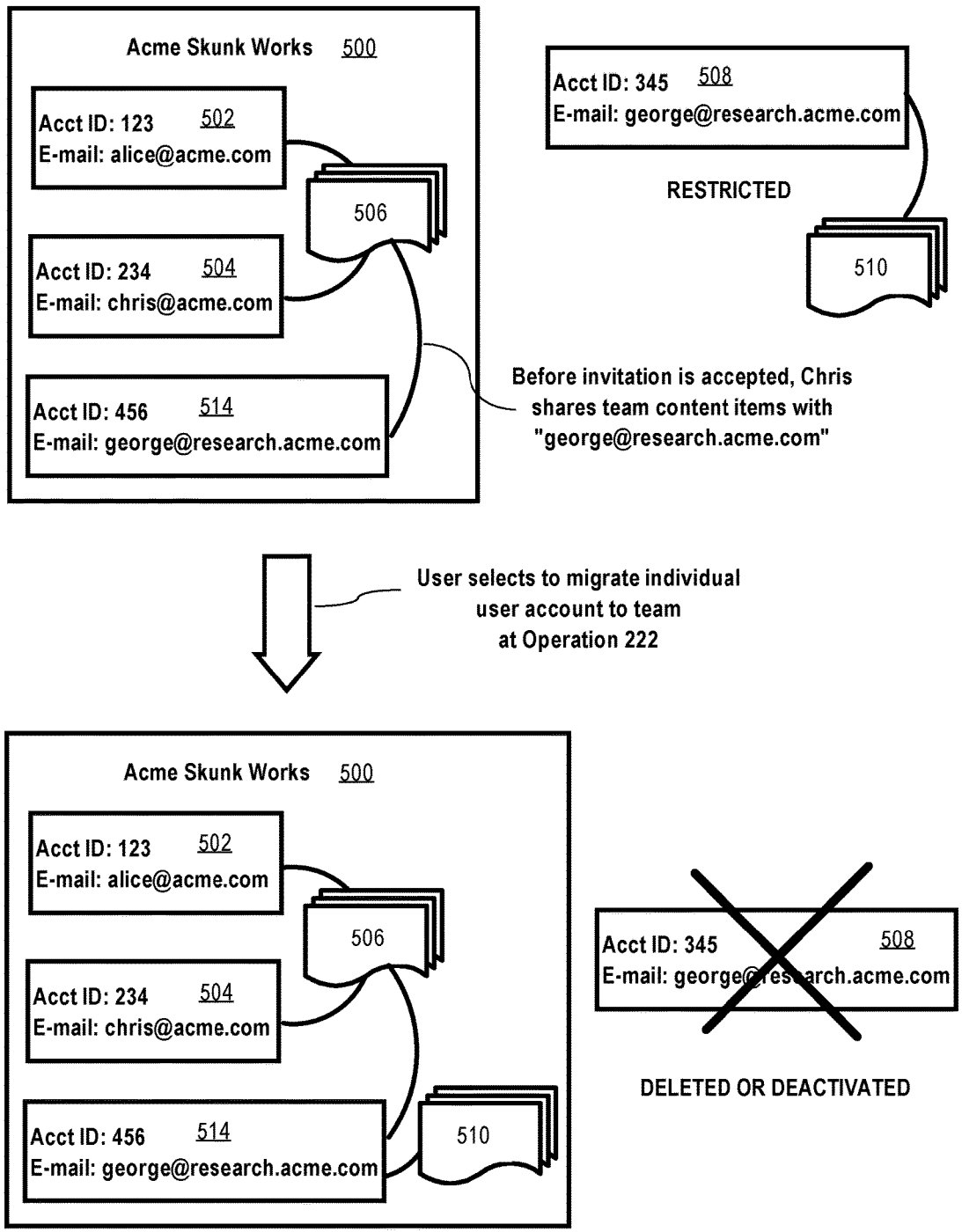
FIG. 10 illustrates an invite enforcement scenario where an invited user selects to migrate an individual user account to a team when joining the team according to some example embodiments of the present invention.

FIG. 10 illustrates the scenario of FIG. 5 where the user at "george@research.acme.com" has accepted the invitation to join the team and selected to migrate the individual user account 508 to the team 500. After the migration is complete, content items 510 previously associated with individual user account 508 are now associated with team account 514. And the restricted individual user account 508 has been deleted or deactivated.

Figure 11:
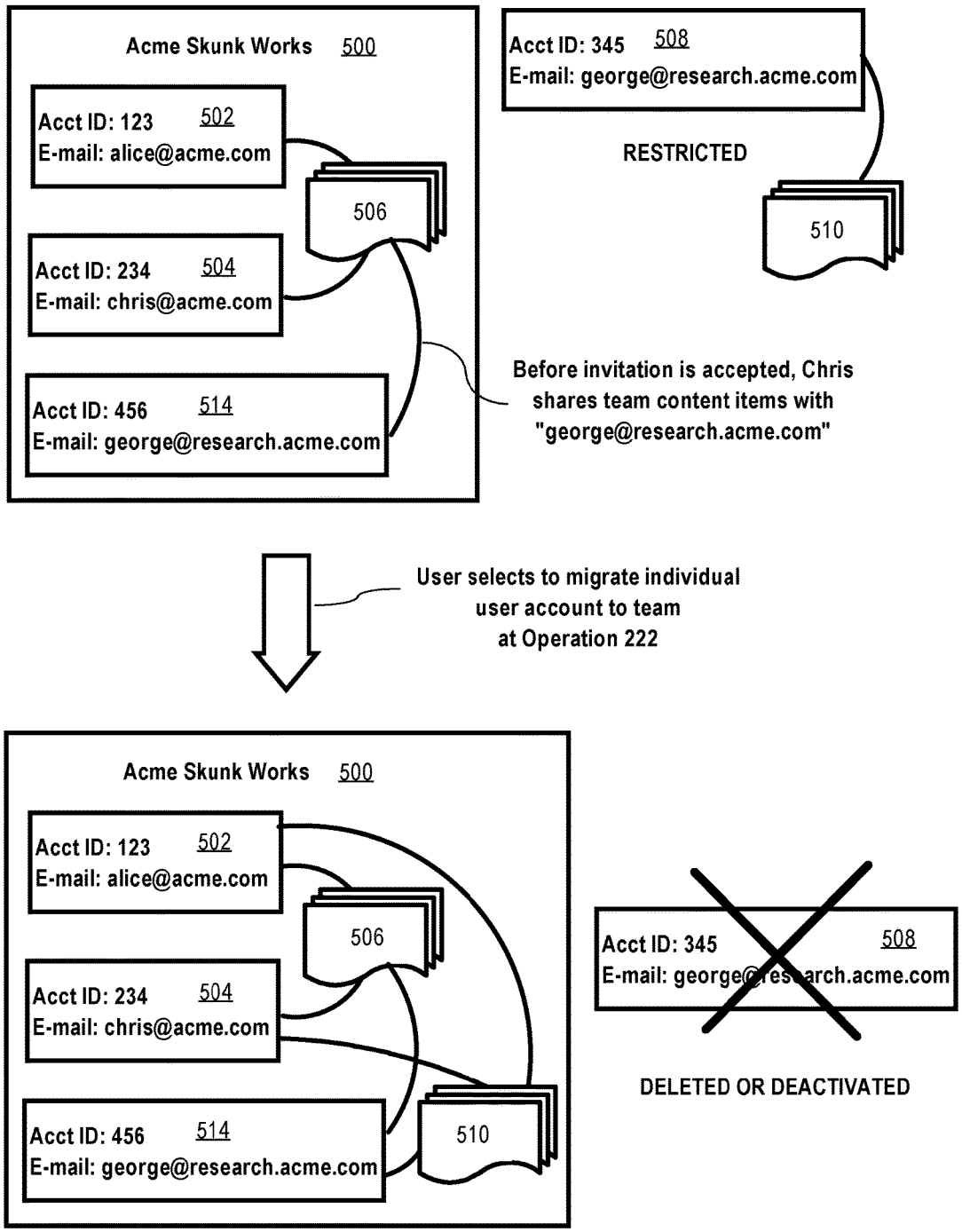
FIG. 11 illustrates another invite enforcement scenario where an invited user selects to migrate an individual user account to a team when joining the team according to some example embodiments of the present invention.

According to some example embodiments, when a user selects to migrate an individual user account to a team account, the user's content items associated with the individual user account are migrated by the online service only to the team account. That is, only the team account has access to the migrated content items immediately after the migration. However, the user of the team account may choose to subsequently share those content items with other members of the team or with users outside the team, if permitted by team access controls. In other embodiments, the online service automatically migrates the content items to all user accounts of the team. This scenario is shown in FIG. 11 where team accounts 502, 504, and 514 have access to migrated content items 510 immediately after the migration.

Figure 12:
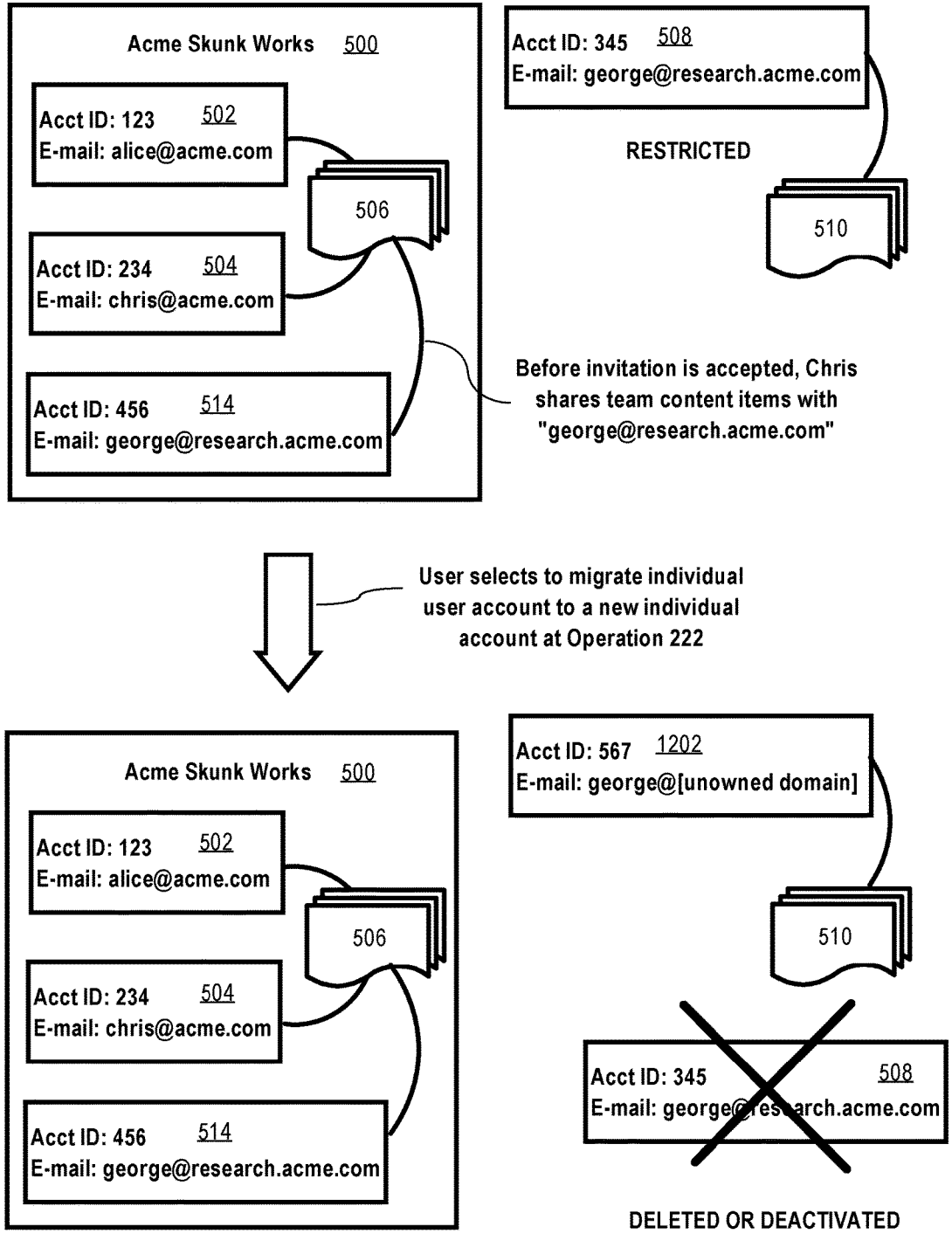
FIG. 12 illustrates an invite enforcement scenario where an invited user selects to migrate an individual user account to a new individual user account when joining a team according to some example embodiments of the present invention.

FIG. 12 illustrates the scenario of FIG. 5 where the user at "george@research.acme.com" has accepted the invitation to join the team and selected to migrate the individual user account 508 to a new individual user account 1202. The new individual user account 1202 has a user account identifier of "567" and is associated with an unowned e-mail address provided by the user. Further, content items 510 previously associated with user account 508 are now associated by the online service with the new account 1202.

3.12 Alternative Migration

While in some embodiments in which the user selects to migrate an individual user account to a team account any content items associated with the individual user account are associated with the team account and the individual user account is deleted or deactivated, content items associated with the team account are associated with the individual user account, the individual user account is converted to a team account and made a member of the team, and the placeholder team account is deleted or deactivated in other example embodiments.

Figure 13:
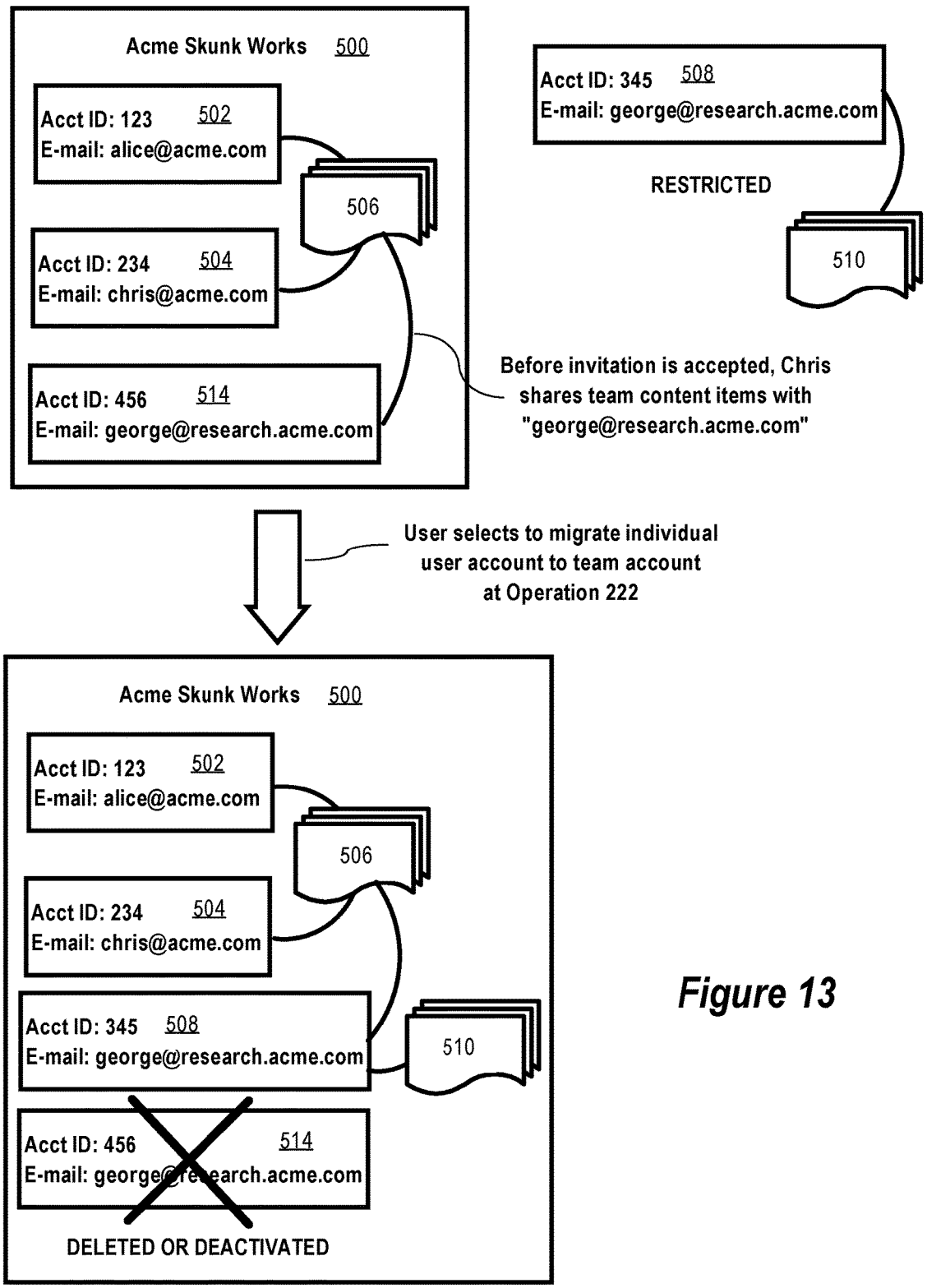
FIG. 13 illustrates yet another invite enforcement scenario where an invited user selects to migrate an individual user account to a team when joining the team according to some example embodiments of the present invention.

For example, FIG. 13 depicts a scenario where the user has selected to migrate the individual user account 508 to the team 500 at Operation 222. As a result, individual user account 508 is converted to a team account by making it a member of the team 500. Further, content items 506 associated with placeholder team account 514 at the time of the migration are associated by the online service with the now team account 508. The placeholder team account 514 is then deleted or deactivated. As reason for doing the migration this way is so that the individual user account and the team account have the same user account identifier before and after the migration. For example, user account 508 before and after the migration has the same account identifier "345."

3.13 Durable Team Member Identifier

In the alternative migration scenario just described, the team account associated with the invited e-mail address (e.g., "george@research.acme.com") undergoes a change in the user account identifier when the user chooses to migrate an existing individual user account to the team. For example, before migrating individual user account 508 to team 500, the placeholder team account 514 identifier is "456." After migrating individual user account 508 to team 500, the team account 608 identifier is "345."

According to some example embodiments of the present invention, a durable team member identifier is assigned by the online service to the placeholder team account when created. The durable team member identifier uniquely identifies a member of the team. If the user selects to migrate an individual user account to the team, then the durable team member identifier is associated with the team account. If the user selects to migrate the individual user account to a new individual user account, then the durable team member identifier is retained when the placeholder status if lifted from the team account. In both migration situations, the same identifier may be used to refer to the team account of a member of the team before and after the migration. This is useful for processes of the online service that perform operations (e.g., analytics, reporting) that need to consistently refer to the same team member via the member's team account while an invitation to the member to the join the team is pending and after the invitation is accepted by the member.

Figure 14:
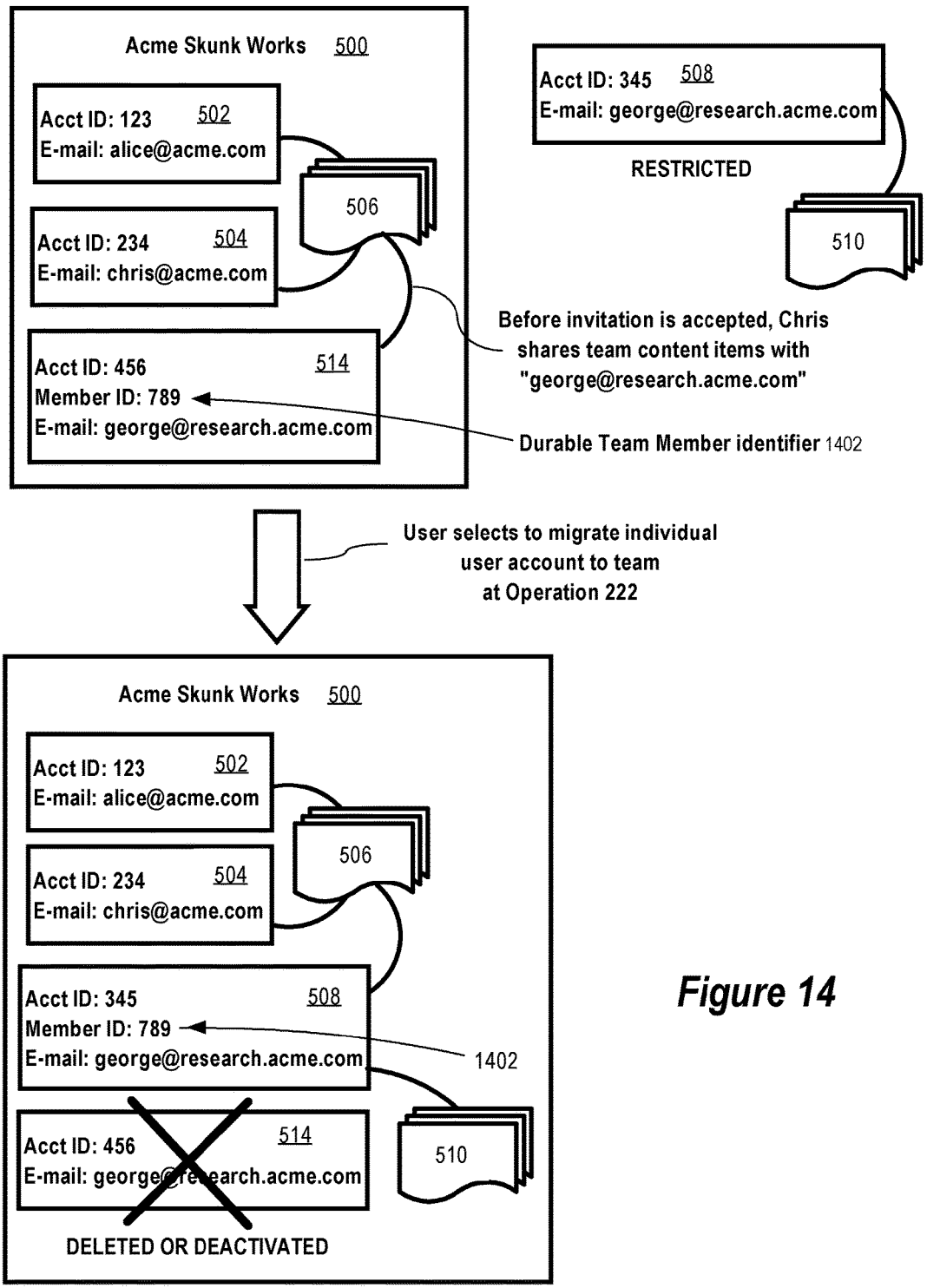
FIG. 14 illustrates a possible use of durable team member identifiers for team accounts according to some example embodiments of the present invention.

FIG. 14 illustrates the scenario of FIG. 13 where the placeholder team account 514 is assigned the durable team member identifier 1402 of "789". After the user selects the operation to migrate the individual user account 508 to the team 500, the durable team member identifier 1402 is associated with team account 508. Thus, the durable team member identifier "789" can be used to identify the team account of the team member before and after the user accepts the invitation to join the team 500.

4.0 Domain Capture

Invite enforcement is useful to motivate a user at an owned e-mail address to join a team under the management of the owner of the e-mail address. However, invite enforcement requires the invitee to know or have access to the e-mail address of user in order to make the invitation. Unfortunately, an owner of an owned domain may have hundreds or thousands of users using an owned e-mail address with the online service. Because of this large number of users, the owner may not know all of the owned e-mail address being used with the online service. Further, the online service, due to privacy restrictions or terms of service, may not be able to provide a list of owned e-mail address associated individual user accounts to the owner. Thus, a new technique is needed. The new technique may be used in addition to or instead of the invite enforcement technique described above. The new technique is referred to herein generally as domain capture.

4.1 Invisible Team Accounts

According to one aspect of domain capture technique, the online service creates an "invisible" team account which is made visible by the online service to other team members only after a user at the owned e-mail address associated with the invisible team account accepts an invitation to join the team. When invisible, users of other accounts of the online service are not made aware of the existence of the invisible account when using the online service. For example, other team members of the team are not made aware of the invisible team account until the team member accepts the invitation to join the team. The invisible status of a team account may be represented by metadata associated with the account in a database (e.g., database 106). The invitation may be automatically made by the online service without requiring input or approval from a team member or the owner. In this way, whether the user is using the owned e-mail address with an individual user account is not revealed to the other team members or the owner.

Figure 15:
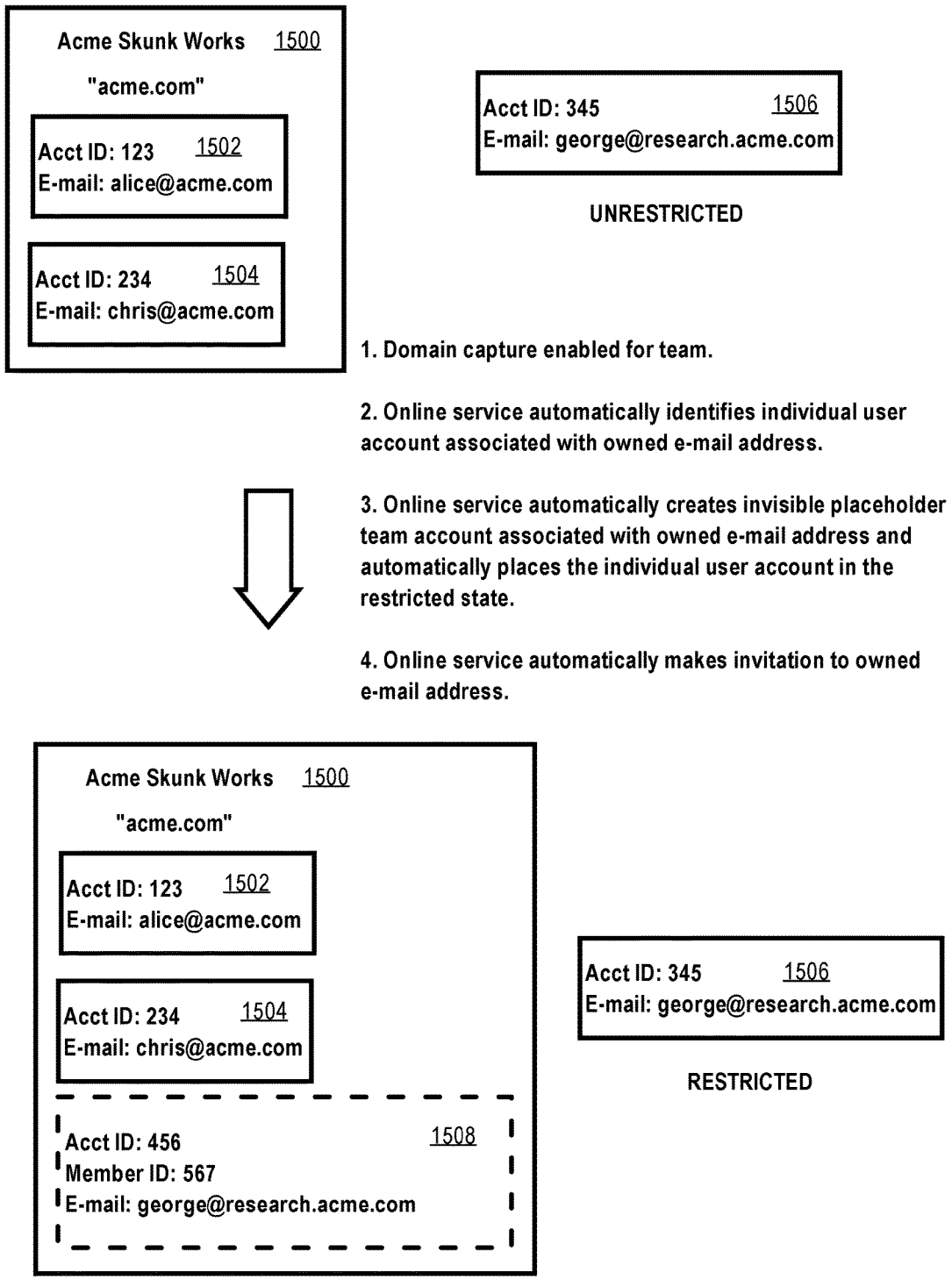
FIG. 15 illustrates a domain capture scenario where an invisible placeholder team account is used according to some example embodiments of the present invention.

FIG. 15 illustrates the use of invisible team accounts in the context of domain capture. Initially, team 500 is associated with owned domain "acme.com" and has two members: team account 1502 and team account 1504. There is also an individual user account 1506 associated with an e-mail address (george@research.acme.com) that belongs to the owned domain "acme.com."

FIG. 15 also illustrates the team 500 after domain capture is enabled for the team 500. In particular, the online service has identified individual user account 1506 as being associated with an owned e-mail address that belongs to an owned domain associated with the team 500. The online service has created an invisible placeholder team account 1508 that is like the placeholder team account described above with respect to invite enforcement except that the invisible placeholder team account 1508 is not visible to other user accounts of the online service including team accounts 1502 and 1504 and individual user account 1506. In addition, the online service has automatically placed the individual user account 1506 in the restricted state.

At the same time as creating the invisible placeholder team account 1508 and placing the individual user account 1506 in the restricted state, the online service automatically makes an invitation to join team 500 to the e-mail address "george@research.acme.com". Once the invitation is made, the user may join the team by accepting the invitation as in the invite enforcement technique. However, unlike with invite enforcement, a team account associated with the owned e-mail address "george@research.acme.com" is not visible to other user accounts until the invitation is accepted.

4.2 New Users

According to some example embodiments, when domain capture is enabled for a team (as indicated by metadata associated with the team in a database) and a user registers to create an account with the online service using an e-mail address that belongs to an owned domain associated with the team, the user is prompted by the online service to create a team account with the team. In this way, the user can only create an account with the online service using an e-mail address that belongs to an owned domain associated with a team for which domain capture is enabled if the account is a team account that belongs to the team.

4.3 Throttling Domain Capture

When domain capture is enabled for a team (as indicated by metadata associated with the team in a database) there may be a large number of users holding individual user accounts with the online service that are associated with an e-mail belonging to an owned domain associated with the team. In this case, the owner of the owned domain or the administrator of the team may not want all these users to join the team at the same time or within a short period of time of each other. For example, the owner may have purchased only a certain number of software licenses for team accounts from the online service operator.

According to some example embodiment, when domain capture is enabled for a team, the number of users that are captured is limited by a configurable parameter. For example, the parameter may be configured by an administrator of the team. For example, an administrator of a team may limit the number of users captured to 100. When the number of captures is limited, if an individual user account associated with owned e-mail address identified and the number of users that have already been captured exceed the configured number, then the individual user account may still be placed in the restricted state. However, instead of being presented with an invitation to join the team, the user may be presented a message that informs the user that he or she can no longer use individual user account with the owned e-mail address. The user may also be given the option to change the e-mail address associated with the individual user account. If the allowed number of captured is increased by the administrator, then the user may then be invited to join the team.

Basic Computing Device

Figure 16:
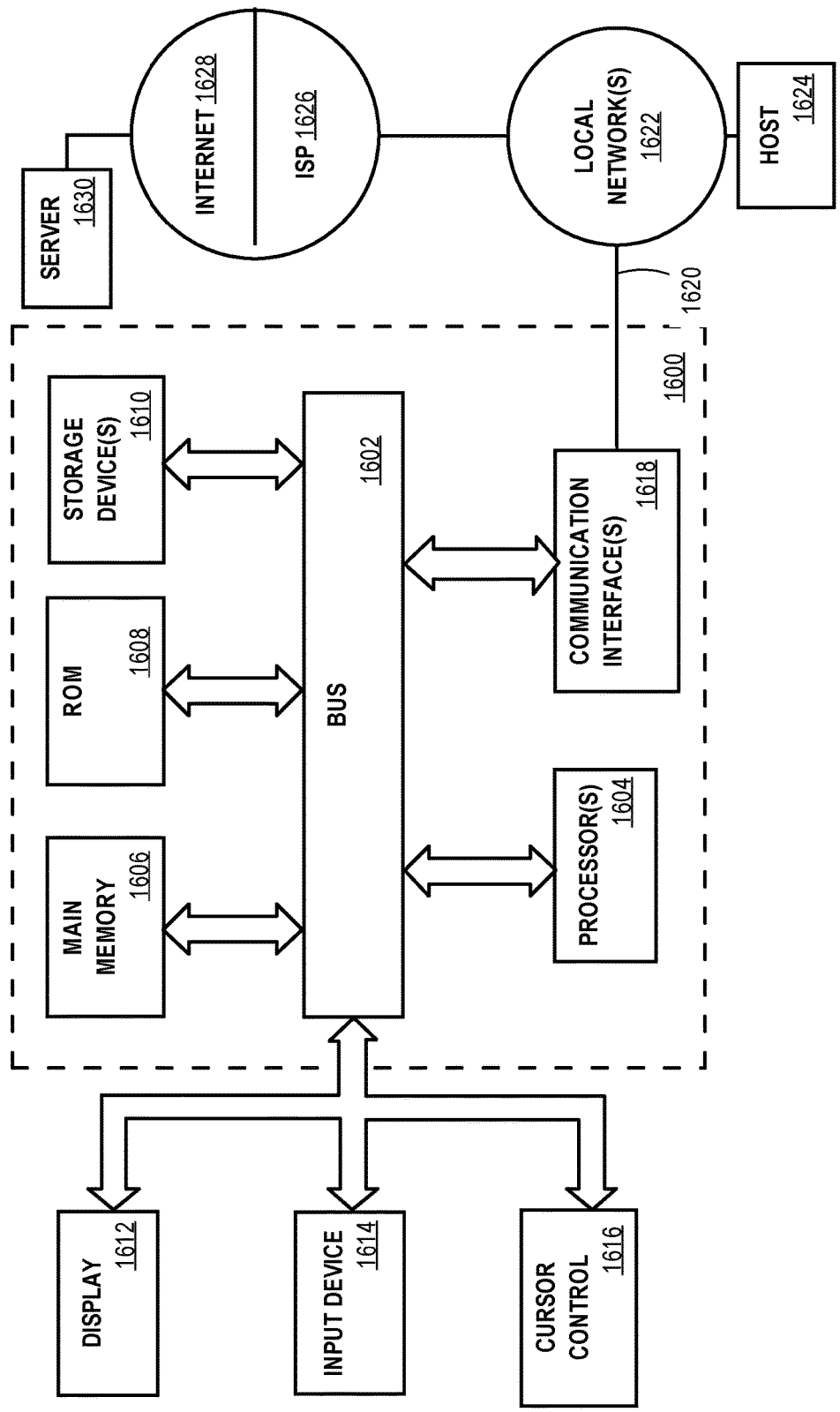
FIG. 16 is a very general block diagram of a computing device in which the example embodiments of the present invention may be embodied.

Referring now to FIG. 16, it is a block diagram that illustrates a basic computing device 1600 in which the example embodiment(s) of the present invention may be embodied. Computing device 1600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1600 may include a bus 1602 or other communication mechanism for addressing main memory 1606 and for transferring data between and among the various components of device 1600.

Computing device 1600 may also include one or more hardware processors 1604 coupled with bus 1602 for processing information. A hardware processor 1604 may be a general-purpose microprocessor, a system on a chip (SoC), or other processor.

Main memory 1606, such as a random-access memory (RAM) or other dynamic storage device, also may be coupled to bus 1602 for storing information and software instructions to be executed by processor(s) 1604. Main memory 1606 also may be used for storing temporary variables or other intermediate information during execution of software instructions to be executed by processor(s) 1604.

Software instructions, when stored in storage media accessible to processor(s) 1604, render computing device 1600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1600 also may include read only memory (ROM) 1608 or other static storage device coupled to bus 1602 for storing static information and software instructions for processor(s) 1604.

One or more mass storage devices 1610 may be coupled to bus 1602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1610 (e.g., the main hard disk for the device) stores a body of program and data for directing operation of the computing device, including an operating system, user application programs, driver and other support files, as well as other data files of all sorts.

Computing device 1600 may be coupled via bus 1602 to display 1612, such as a liquid crystal display (LCD) or other electronic visual display, for displaying information to a computer user. In some configurations, a touch sensitive surface incorporating touch detection technology (e.g., resistive, capacitive, etc.) may be overlaid on display 1612 to form a touch sensitive display for communicating touch gesture (e.g., finger or stylus) input to processor(s) 1604.

An input device 1614, including alphanumeric and other keys, may be coupled to bus 1602 for communicating information and command selections to processor 1604. In addition to or instead of alphanumeric and other keys, input device 1614 may include one or more physical buttons or switches such as, for example, a power (on/off) button, a "home" button, volume control buttons, or the like.

Another type of user input device may be a cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

While in some configurations, such as the configuration depicted in FIG. 16, one or more of display 1612, input device 1614, and cursor control 1616 are external components (i.e., peripheral devices) of computing device 1600, some or all of display 1612, input device 1614, and cursor control 1616 are integrated as part of the form factor of computing device 1600 in other configurations.

Functions of the disclosed systems, methods, and modules may be performed by computing device 1600 in response to processor(s) 1604 executing one or more programs of software instructions contained in main memory 1606. Such software instructions may be read into main memory 1606 from another storage medium, such as storage device(s) 1610. Execution of the software instructions contained in main memory 1606 cause processor(s) 1604 to perform the functions of the example embodiment(s).

While functions and operations of the example embodiment(s) may be implemented entirely with software instructions, hard-wired or programmable circuitry of computing device 1600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random-access memory (NVRAM), flash memory, optical disks, magnetic disks, or solid-state drives, such as storage device 1610. Volatile media includes dynamic memory, such as main memory 1606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more software instructions to processor(s) 1604 for execution. For example, the software instructions may initially be carried on a magnetic disk or solid-state drive of a remote computer. The remote computer can load the software instructions into its dynamic memory and send the software instructions over a telephone line using a modem. A modem local to computing device 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor(s) 1604 retrieves and executes the software instructions. The software instructions received by main memory 1606 may optionally be stored on storage device(s) 1610 either before or after execution by processor(s) 1604.

Computing device 1600 also may include one or more communication interface(s) 1618 coupled to bus 1602. A communication interface 1618 provides a two-way data communication coupling to a wired or wireless network link 1620 that is connected to a local network 1622 (e.g., Ethernet network, Wireless Local Area Network, cellular phone network, Bluetooth wireless network, or the like). Communication interface 1618 sends and receives electrical, electromagnetic, or optical signals that carry digital data streams representing various types of information. For example, communication interface 1618 may be a wired network interface card, a wireless network interface card with an integrated radio antenna, or a modem (e.g., ISDN, DSL, or cable modem).

Network link(s) 1620 typically provide data communication through one or more networks to other data devices. For example, a network link 1620 may provide a connection through a local network 1622 to a host computer 1624 or to data equipment operated by an Internet Service Provider (ISP) 1626. ISP 1626 in turn provides data communication services through the world-wide packet data communication network now commonly referred to as the "Internet" 1628. Local network(s) 1622 and Internet 1628 use electrical, electromagnetic or optical signals that carry digital data streams. The signals through the various networks and the signals on network link(s) 1620 and through communication interface(s) 1618, which carry the digital data to and from computing device 1600, are example forms of transmission media.

Computing device 1600 can send messages and receive data, including program code, through the network(s), network link(s) 1620 and communication interface(s) 1618. In the Internet example, a server 1630 might transmit a requested code for an application program through Internet 1628, ISP 1626, local network(s) 1622 and communication interface(s) 1618.

The received code may be executed by processor 1604 as it is received, and/or stored in storage device 1610, or other non-volatile storage for later execution.

Basic Software System

Figure 17:
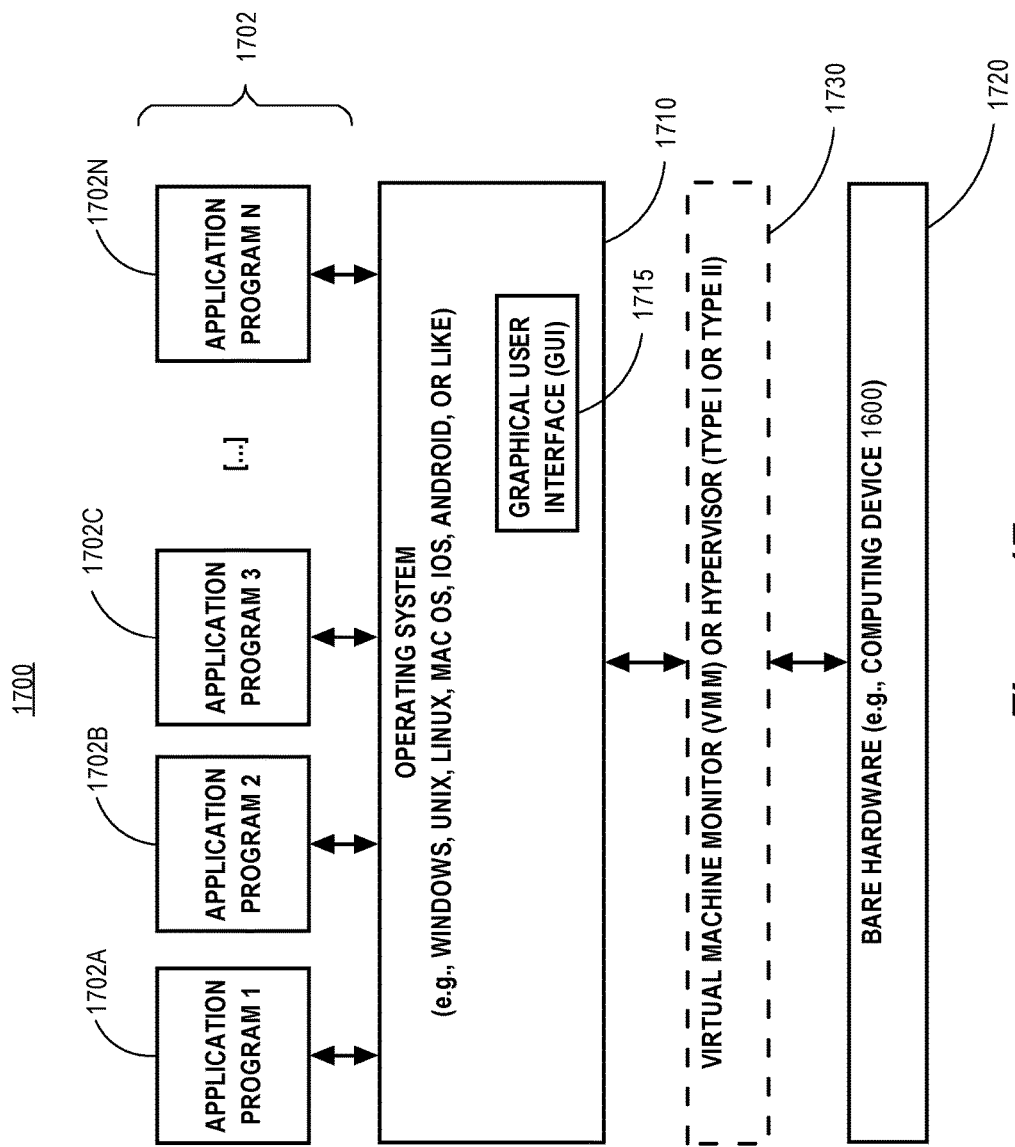
FIG. 17 is a block diagram of a basic software system for controlling the operation of the computing device.

FIG. 17 is a block diagram of a basic software system 1700 that may be employed for controlling the operation of computing device 1600. Software system 1700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1700 is provided for directing the operation of computing device 1600. Software system 1700, which may be stored in system memory (RAM) 1606 and on fixed storage (e.g., hard disk or flash memory) 1610, includes a kernel or operating system (OS) 1710.

The OS 1710 manages low-level aspects of computer operation, including managing execution of processes, memory allocation, file input and output (I/O), and device I/O. One or more application programs, represented as 1702A, 1702B, 1702C . . . 1702N, may be "loaded" (e.g., transferred from fixed storage 1610 into memory 1606) for execution by the system 1700. The applications or other software intended for use on device 1700 may also be stored as a set of downloadable computer-executable instructions, for example, for downloading and installation from an Internet location (e.g., a Web server, an app store, or other online service). In some configurations, one or more application programs 1702 may execute within a software container (e.g., a DOCKER container) that executes on the operating system 1710.

Software system 1700 includes a graphical user interface (GUI) 1715, for receiving user commands and data in a graphical (e.g., "point-and-click" or "touch gesture") fashion. These inputs, in turn, may be acted upon by the system 1700 in accordance with instructions from operating system 1710 and/or application(s) 1702. The GUI 1715 also serves to display the results of operation from the OS 1710 and application(s) 1702, whereupon the user may supply additional inputs or terminate the session (e.g., log off).

OS 1710 can execute directly on the bare hardware 1720 (e.g., processor(s) 1604) of device 1600. Alternatively, a Type I or Type II hypervisor or virtual machine monitor (VMM) 1730 may be interposed between the bare hardware 1720 and the OS 1710. In this configuration, VMM 1730 acts as a software "cushion" or virtualization layer between the OS 1710 and the bare hardware 1720 of the device 1600. If VMM 1730 is a Type I virtual machine monitor, then VMM 1730 may execute directly on the bare hardware 1720. If, on the other hand, VMM 1730 is Type II virtual machine monitor, then VMM 1730 may execute on a host operation system (not shown) that executes directly on the bare hardware 1720.

VMM 1730 instantiates and runs one or more virtual machine instances ("guest machines"). Each guest machine comprises a "guest" operating system, such as OS 1710, and one or more applications, such as application(s) 1702, designed to execute on the guest operating system. The VMM 1730 presents the guest operating systems with a virtual operating platform and manages the execution of the guest operating systems.

In some instances, the VMM 1730 may allow a guest operating system to run as if it is running on the bare hardware 1720 of device 1600 directly. In these instances, the same version of the guest operating system configured to execute on the bare hardware 1720 directly may also execute on VMM 1730 without modification or reconfiguration. In other words, VMM 1730 may provide full hardware and CPU virtualization to a guest operating system in some instances.

In other instances, a guest operating system may be specially designed or configured to execute on VMM 1730 for efficiency. In these instances, the guest operating system is "aware" that it executes on a virtual machine monitor. In other words, VMM 1730 may provide para-virtualization to a guest operating system in some instances.

EXTENSIONS AND ALTERNATIVES

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:
1. A method, comprising:
 detecting, using an online service system, an attempt to create a personal user account with the online service system;

wherein the attempt uses a first electronic mail address that belongs to an owner of a particular domain name service domain;
wherein the online service system executes using one or more computer systems;
based on the detecting the attempt to create the personal user account using the first electronic mail address that belongs to the owner of the particular domain name service domain, prompting, using the online service system, a user associated with the attempt to create a team account with the online service that is under management of the owner of the particular domain name service domain;
based on the detecting the attempt to create the personal user account using the first electronic mail address that belongs to the owner of the particular domain name service domain, offering, using the online service system, the user an option of creating a personal user account with the online service using an electronic mail address having a domain name service domain that is different from the particular domain name service domain; and
wherein the method is performed by a computing system having one or more processors and storage media storing one or more computer programs, the one or more computer programs having instructions configured to perform the method.

2. The method of claim 1, wherein in the detecting the attempt to create the personal user account using the first electronic mail address that belongs to the owner of the particular domain name service domain is based on determining that a domain name portion of the first electronic mail address is in a set of owned domain name service domains; and wherein the set of owned domain name service domains includes the particular domain name service domain.

3. The method of claim 1, further comprising:
based on the offering the user the option of creating a personal user account with the online service system using a second electronic mail address having a domain name service domain that is different from the particular domain name service domain, receiving a second electronic mail address from the user and creating a personal user account with the online service system including associating the personal user account with the second electronic mail address.

4. The method of claim 3, further comprising:
identifying a domain name portion of the second electronic mail address;
verifying that the domain name portion of the second electronic mail address is not in a set of owned domain name service domains; and
wherein the set of owned domain name service domains includes the particular domain name service domain.

5. The method of claim 1, wherein the offering the user the option of creating a personal user account with the online service system using an electronic mail address having a domain name service domain that is different from the particular domain name service domain is based on causing a graphical user interface to be presented to the user, the graphical user interface indicating that first electronic mail address is owned by the owner.

6. The method of claim 1, wherein the offering the user the option of creating a personal user account with the online service system using an electronic mail address having a domain name service domain that is different from the particular domain name service domain is based on causing a graphical user interface to be presented to the user, the graphical user interface indicating that particular domain name service domain is owned by the owner.

7. The method of claim 1, further comprising:
creating a team account with the online service system that is under management of the owner of the particular domain name service domain including associating the first electronic mail address with the team account.

8. One or more non-transitory computer-readable media carrying one or more computer programs, the one or more computer programs having instructions for execution by one or more processors, the instructions configured for:
detecting, using an online service system, an attempt to create a personal user account with the online service system; wherein the attempt uses a first electronic mail address that belongs to an owner of a particular domain name service domain; wherein the online service system executes using one or more computer systems;
based on the detecting the attempt to create the personal user account using the first electronic mail address that belongs to the owner of the particular domain name service domain, prompting, using the online service system, a user associated with the attempt to create a team account with the online service system that is under management of the owner of the particular domain name service domain; and
based on the detecting the attempt to create the personal user account using the first electronic mail address that belongs to the owner of the particular domain name service domain, offering, using the online service system, the user an option of creating a personal user account with the online service system using an unowned electronic mail address.

9. The one or more non-transitory computer-readable media of claim 8, wherein in the detecting the attempt to create the personal user account using the first electronic mail address that belongs to the owner of the particular domain name service domain is based on determining that a domain name portion of the first electronic mail address is in a set of owned domain name service domains; and wherein the set of owned domain name service domains includes the particular domain name service domain.

10. The one or more non-transitory computer-readable media of claim 8, the instructions further configured for:
based on the offering the user the option of creating a personal user account with the online service system using an unowned electronic mail address, receiving a second electronic mail address from the user and creating a personal user account with the online service system including associating the personal user account with the second electronic mail address.

11. The one or more non-transitory computer-readable media of claim 10, the instructions further configured for:
identifying a domain name portion of the second electronic mail address; and
verifying that the domain name portion of the second electronic mail address is not in a set of owned domain name service domains, the set of owned domain name service domains including the particular domain name service domain.

12. The one or more non-transitory computer-readable media of claim 8, wherein the offering the user the option of creating a personal user account with the online service system using an unowned electronic mail address is based on causing a graphical user interface to be presented to the user, the graphical user interface indicating that first electronic mail address is owned.

13. The one or more non-transitory computer-readable media of claim 8, wherein the offering the user the option of creating a personal user account with the online service system using an unowned electronic mail address is based on causing a graphical user interface to be presented to the user, the graphical user interface indicating that particular domain name service domain is owned.

14. The one or more non-transitory computer-readable media of claim 9, the instructions further configured for:
   creating a team account with the online service system that is under management of the owner of the particular domain name service domain including associating the first electronic mail address with the team account.

15. A computing system of an online service, the computing system comprising:
   one or more processors;
   storage media;
   one or more computer programs stored on the storage media, the one or more computer programs having instructions for execution by the one or more processors, the instructions configured for:
   detecting an attempt to create a personal user account with the online service; wherein the attempt uses a first electronic mail address that belongs to an owner of a particular domain name service domain;
   based on the detecting the attempt to create the personal user account using the first electronic mail address that belongs to the owner of the particular domain name service domain, causing a first graphical user interface to be presented to a user associated with the attempt, the first graphical user interface prompting the user to create a team account with the online service that is under management of the owner of the particular domain name service domain; and
   based on the detecting the attempt to create the personal user account using the first electronic mail address that belongs to the owner of the particular domain name service domain, causing a second graphical user interface to be presented to the user, the second graphical user interface offering the user an option of creating a personal user account with the online service using an unowned electronic mail address.

16. The computing system of claim 15, wherein the first graphical user interface is the second graphical user interface.

17. The computing system of claim 15, the instructions further configured for:
   based on the offering the user the option of creating a personal user account with the online service using an unowned electronic mail address, receiving a second electronic mail address from the user and creating a personal user account with the online service including associating the personal user account with the second electronic mail address.

18. The computing system of claim 17, the instructions further configured for:
   identifying a domain name portion of the second electronic mail address; and
   verifying that the domain name portion of the second electronic mail address is not in a set of owned domain name service domains, the set of owned domain name service domains including the particular domain name service domain.

19. The computing system of claim 15, wherein the first graphical user interface indicates that first electronic mail address is owned.

20. The computing system of claim 15, wherein the first graphical user interface indicates that particular domain name service domain is owned.

21. The computing system of claim 15, the instructions further configured for:
   creating a team account with the online service that is under management of the owner of the particular domain name service domain including associating the first electronic mail address with the team account.

* * * * *